United States Patent [19]

Yasuda et al.

[11] 4,405,219

[45] Sep. 20, 1983

[54] OPTICAL IMAGE SYNTHESIS METHOD AND APPARATUS

[75] Inventors: Mitsuo Yasuda, Tenri; Katsuji Minami, Osaka; Jiro Itokawa, Takaishi; Yoshiyuki Aoto, Nara; Yasuyuki Hatakeyama, Nishinomiya; Shinya Sakaida, Yao, all of Japan

[73] Assignee: Sharp Kabushiki Kaisha, Osaka, Japan

[21] Appl. No.: 240,468

[22] Filed: Mar. 4, 1981

[30] Foreign Application Priority Data

Mar. 17, 1980 [JP] Japan .................................. 55-34542
Dec. 8, 1980 [JP] Japan ................................. 55-176000

[51] Int. Cl.³ .............................................. G03B 21/26
[52] U.S. Cl. ....................................... 353/37; 353/28; 353/30
[58] Field of Search ....................... 353/28, 30, 31, 37

[56] References Cited

U.S. PATENT DOCUMENTS

| | | | |
|---|---|---|---|
| 3,059,525 | 10/1962 | Shuftan | 353/37 |
| 3,085,470 | 4/1963 | Berger | 353/37 |
| 3,179,002 | 4/1965 | Crpenter | 353/37 |
| 3,339,453 | 9/1967 | Udich | 353/28 |
| 3,610,120 | 10/1971 | Morse et al. | 353/28 |
| 3,620,623 | 11/1971 | Reams et al. | 353/37 |
| 4,258,478 | 3/1981 | Scott et al. | 353/28 |
| 4,291,955 | 9/1981 | Alverez-Sabater | 353/111 |

Primary Examiner—Steven L. Stephan

Attorney, Agent, or Firm—Birch, Stewart, Kolasch & Birch

[57] ABSTRACT

In one aspect of the present invention, an optical image synthesizer is adapted such that there is provided a partial mirror at the junction of two projecting axes with an angle of 45° with respect to these optical axes for the purpose of projecting a composite image onto a screen. By selectively moving the partial mirror about its rotation axis into the above-mentioned angular position and out of one of the projection ranges, composed images and pre-composed are respectively projected onto the screen. Preferably, the distance between the principal points of respective lenses and the screen are equal to each other within an optical system including the lenses, the mirror and the screen. A source of illuminating light for photographs is focused by means of a cylindrical lens. Means are provided for moving the level of the partial mirror along its height. A microswitch is disposed to sense a photograph holder inserted and energize the illumination lamp only when the holder is sensed. Moreover, it is preferable that a shutter be disposed at an optical path between the mirror and the illumination light source to hide an undesirable image from view. The photographs are made slidable in a vertical direction by use of an adjusting device. When composing a combination of a new coiffure and the face of a customer is desirable, the optical axis of a zoom lens is fixed at the eye-to-eye center of the customer to eliminate any definite boundary therebetween. Preferably, markings indicative of the level of eyes and the center of faces are formed at a facelike aperture in the photograph holder.

27 Claims, 64 Drawing Figures

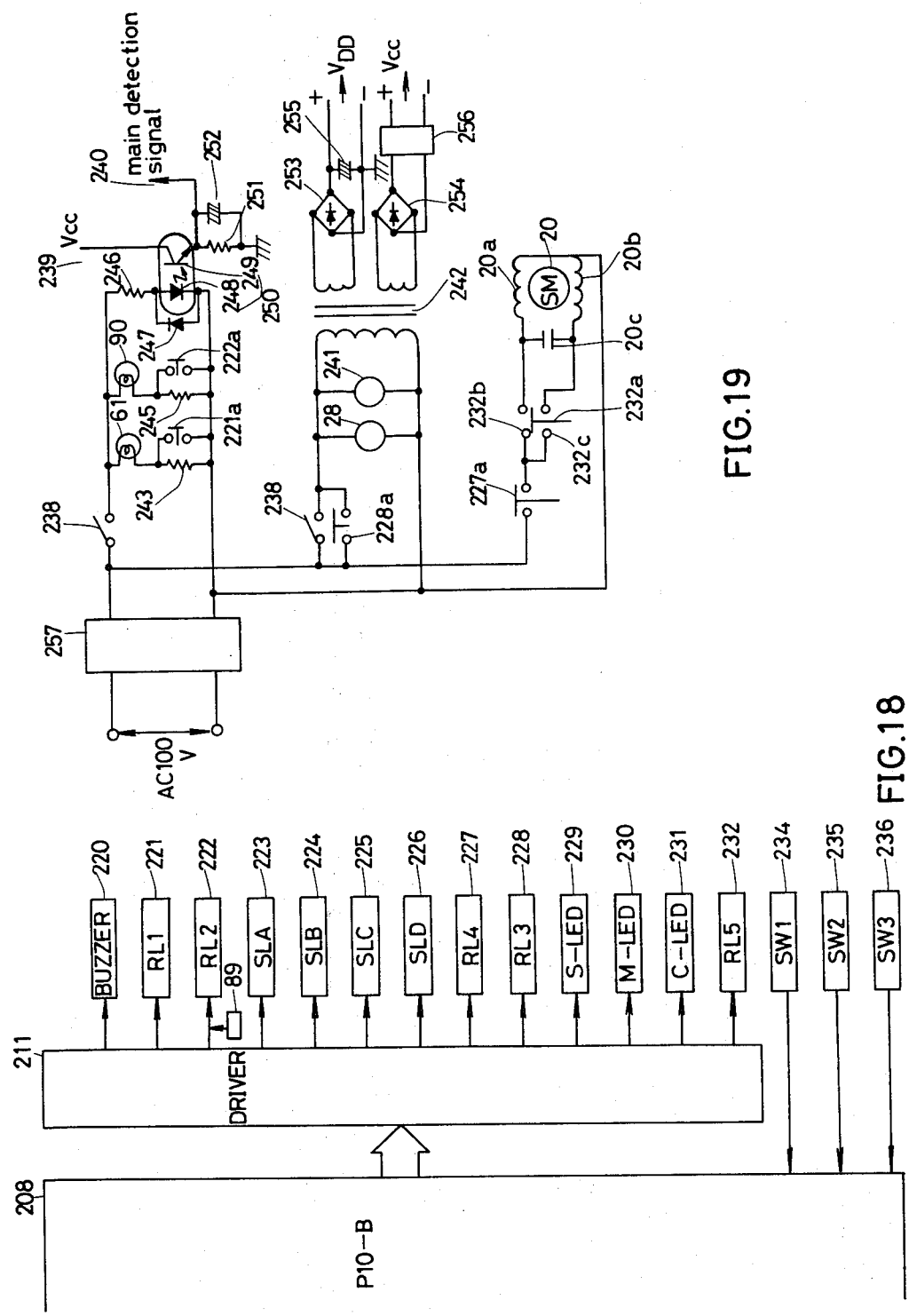

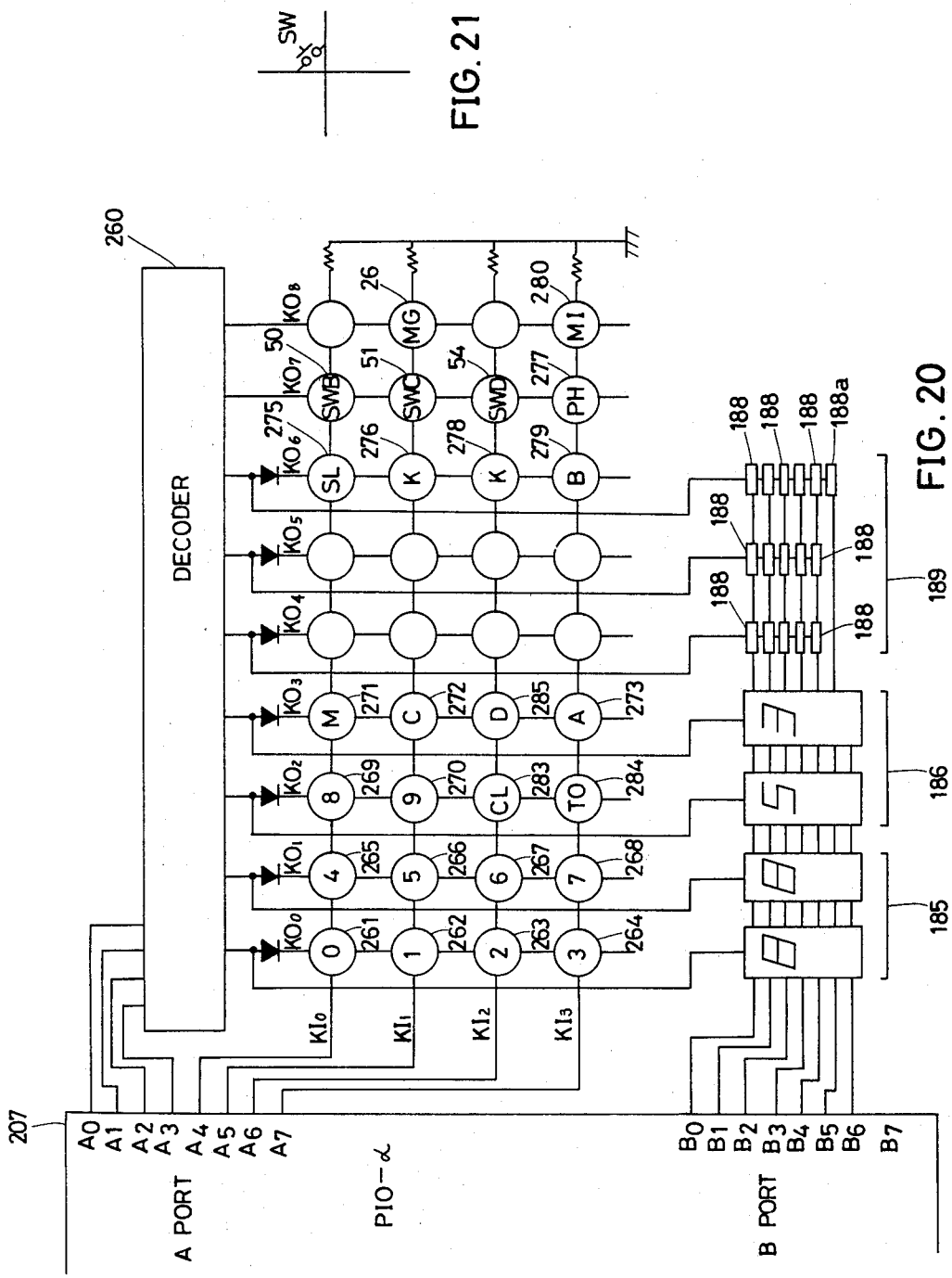

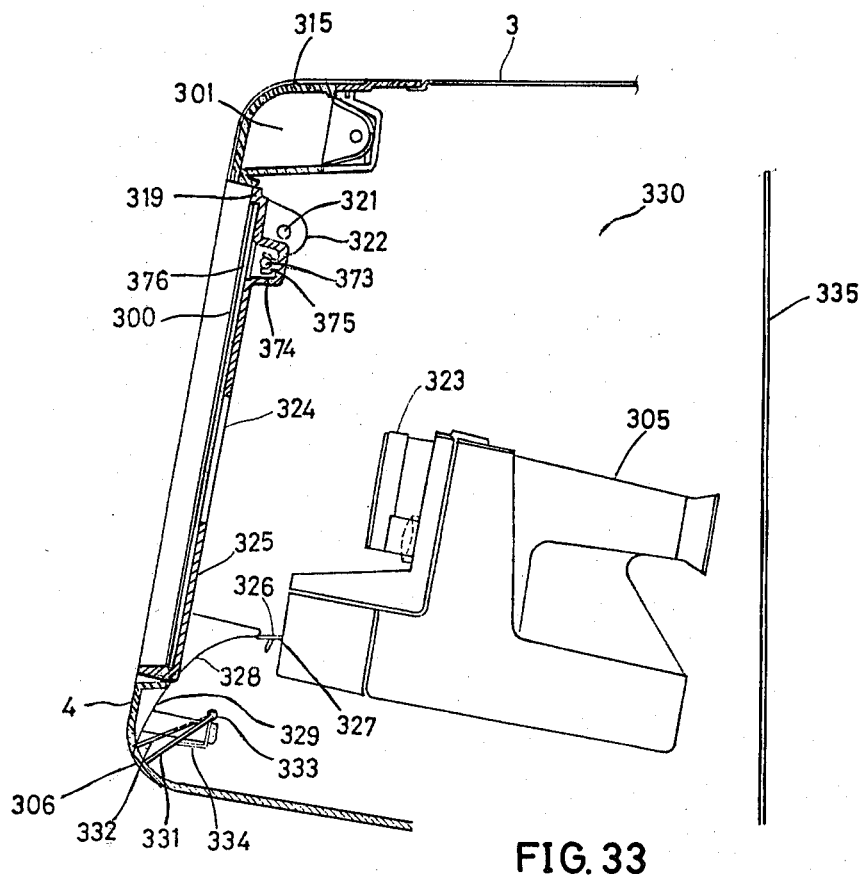
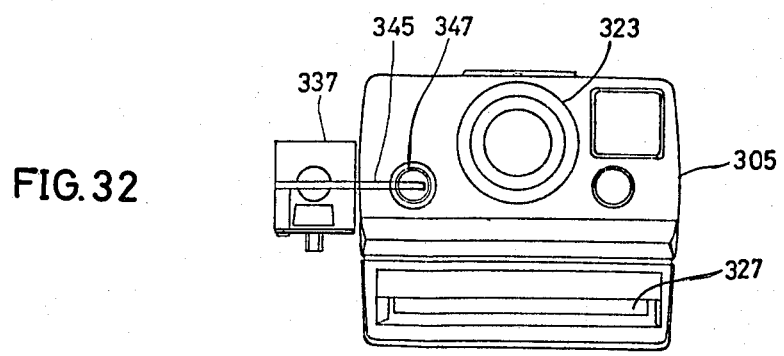
FIG. 33
FIG. 32

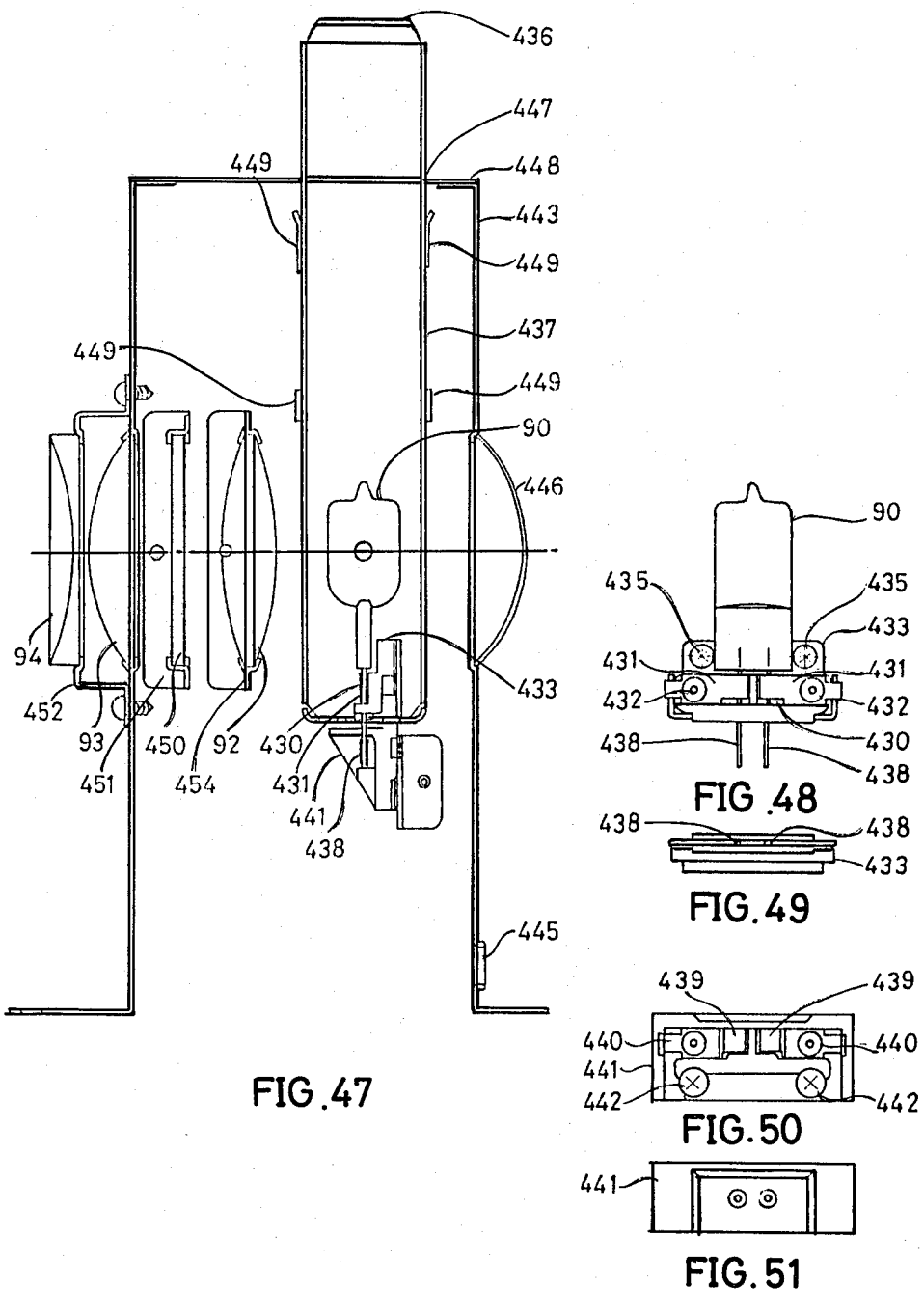

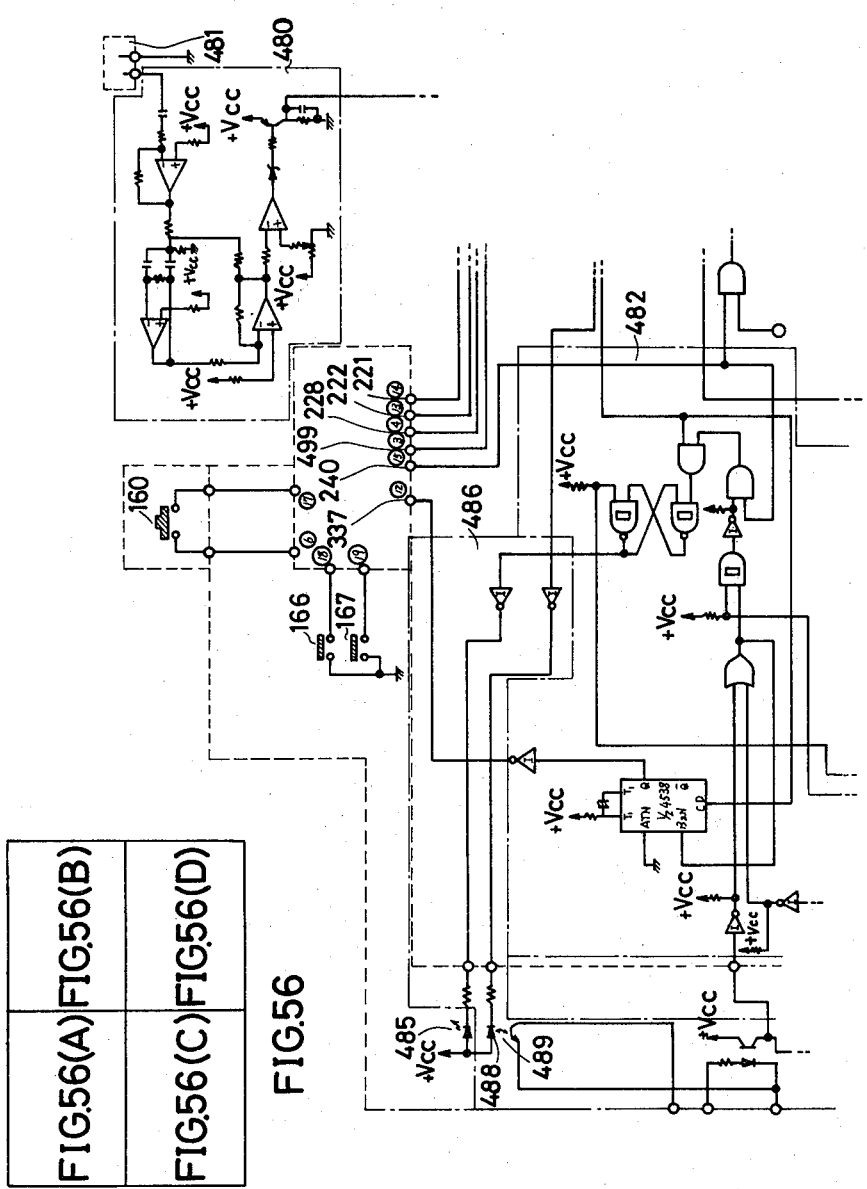

OPTICAL IMAGE SYNTHESIS METHOD AND APPARATUS

BACKGROUND OF THE INVENTION

This invention relates to an optical image synthesis method and apparatus which provides quick and stable composite image upon simple operation.

A typical example of prior art image synthesis machines is disclosed in U.S. Pat. No. 3,339,453 to Steve Udich. This patent provides an effective method for previewing and preselecting a new coiffure by a customer. However, the device uses a plurality of projectors and is complex in structure and time-consuming. It also demands a plurality of prints and transparencies for each of different coiffures. Furthermore, it is essential for synthesis machines to avoid artificiality of composite views.

OBJECTS AND SUMMARY OF THE INVENTION

Accordingly, it is an object of the present invention to provide an optical image synthesis device which is simple in structure and easy to handle.

It is another object of the present invention to provide an optical image synthesizer and projector which provides good quality composite images free from any appreciable boundary.

In one preferred embodiment of the present invention, an optical image synthesizer is adapted such that there is provided a partial mirror at the junction of two projecting axes with an angle of 45° with respect to these optical axes for the purpose of projecting a composite image onto a screen. By selectively moving the partial mirror about its rotation axis into the above-mentioned angular position and out of one of the projection ranges, composed images and pre-composed images are respectively projected onto the screen. Preferably, the distance between the principal points of respective lenses and the screen are equal to each other within an optical system including the lenses, the mirror and the screen. A bundle of light, a source of illuminating light for photographs, is focused by means of a cylindrical lens. Means are provided for moving the level of the partial mirror along its height. A microswitch is disposed to sense a photograph holder inserted and energize the illumination lamp only when the holder is sensed. Moreover, it is preferable that a shutter be disposed in the optical path between the mirror and the illumination light source to hide an undesirable image from view. The photographs are made slidable in a vertical direction by use of an adjusting device. When composing a new coiffure and the face of a customer is desirable, the optical axis of a zoom lens is fixed at the eye-to-eye center to eliminate any definite boundary therebetween. Preferably, markings indicative of the level of eyes and the center of faces are formed at a facelike aperture in the photograph holder.

In another preferred embodiment of the present invention, a camera is assembled into the image synthesis device for taking photographs of the face of the customer. Alignment lines indicative of the width of the face and the level of eyes are described on the finder and pint glass plate. When a magazine is located at its start position immediately after power has been switched ON, markings of the size of the face are projected on slides and precausions regarding manipulation are projected on the screen. When this occurs, the synthesis mirror is dislodged from its operating position and a photograph lamp is brought into warm-up state. A desired film number is introduced via a digit key or keys on an operational board and then displayed on an LED array. Upon actuating a memory key on the operational board that number can be loaded into a storage memory in the interior of the device. Furthermore, upon actuation of a recall key that number can be fetched from the memory and projected on the screen. Preferably, the memory is addressable and typically a random access memory which permits random loading and recalling. The memory is preferably erasable with the use of a memory erase key. There is provided a frame advance key on the operational board with its one end connected to a low frequency oscillator (e.g., unstable multivibrator). An automatic advance key actuated renders the oscillator operable and starts continued frame advance. The interval of such frame advance is adjustable by varying the resistance of a resistor in the oscillator. An integrating circuit is connected at an output terminal of the frame advance key, which prevents a new frame advance signal unless a predetermined period of time has gone.

BRIEF DESCRIPTION OF THE DRAWINGS

For a more complete understanding of the present invention and for further objects and advantages thereof, reference is now made to the following description taken in conjunction with the accompanying drawings, in which:

FIG. 18 is a block diagram of circuit arrangement between PIO- and respective parts via a driver;

FIG. 19 is a circuit diagram of a power supply of FIG. 17;

FIG. 20 is a circuit diagram of a key matrix in FIG. 17;

FIG. 21 is a switch in the key matrix of FIG. 20;

FIG. 32 is a front view of the camera in FIG. 31;

FIG. 33 is a cross sectional side view of the machine of FIG. 31;

FIG. 47 is a cross sectional side view of the light source unit of FIG. 31;

FIG. 48 is a front view of an essential part of a first socket in FIG. 47;

FIG. 49 is a bottom view of the essential part of the socket of FIG. 48;

FIG. 50 is a front view of a second socket in FIG. 47;

FIG. 51 is a plan view of an essential part of the socket of FIG. 50;

FIGS. 56 and 56(a) through 56(d) are detailed circuit diagrams of the circuit arrangement of FIG. 55;

DETAILED DESCRIPTION OF THE INVENTION

Figure 1:
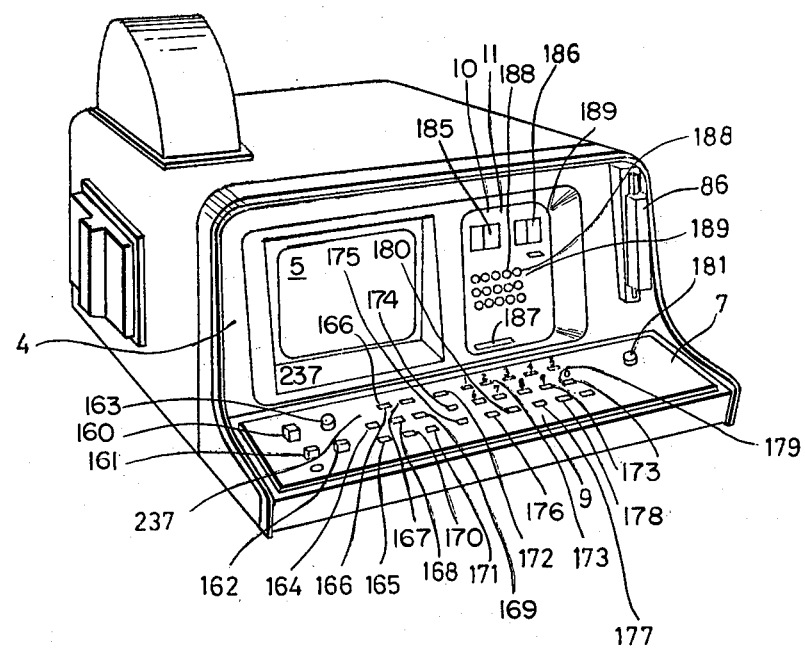
FIG. 1 is a perspective view of the appearance of an image synthesizer and projector according to the present invention.

Referring now to the drawings in more detail particularly FIGS. 1 through 29, there is shown a specific embodiment of the present invention which is applied to an image synthesizer and projector which permits previewing and preselecting a new coiffure by a customer. The image synthesizing and projecting apparatus generally comprises a coiffure projecting assembly 1 for projection of a visual image A of a selected one of different coiffures, a face projecting assembly 2 for projection of a visual image B of the face of the customer who intends to change her coiffure, an image synthesizing assembly 6 by which the visual image B of the face from the face projecting assembly 2 and the visual image A of the coiffure are projected onto a screen 5 disposed on a front panel 4 of a frame 3 and permits the visual image B from the face projecting assembly 2 to reflect from the screen 5 and the visual image A of the coiffure to run through the screen 5 to thereby combine the two visual images A and B into a single composite image on the screen 5, a controller 9 which places the coiffure projecting assembly 1 and the face projecting assembly 2 into desired operating states upon actuation of one or more keys (discussed hereafter) on an operational panel 7 and a visual display 11 which provides in place on a viewing window 10 in the operational panel 4 a visual display of the operating states of the controller 9 and the entire apparatus.

Figure 3:
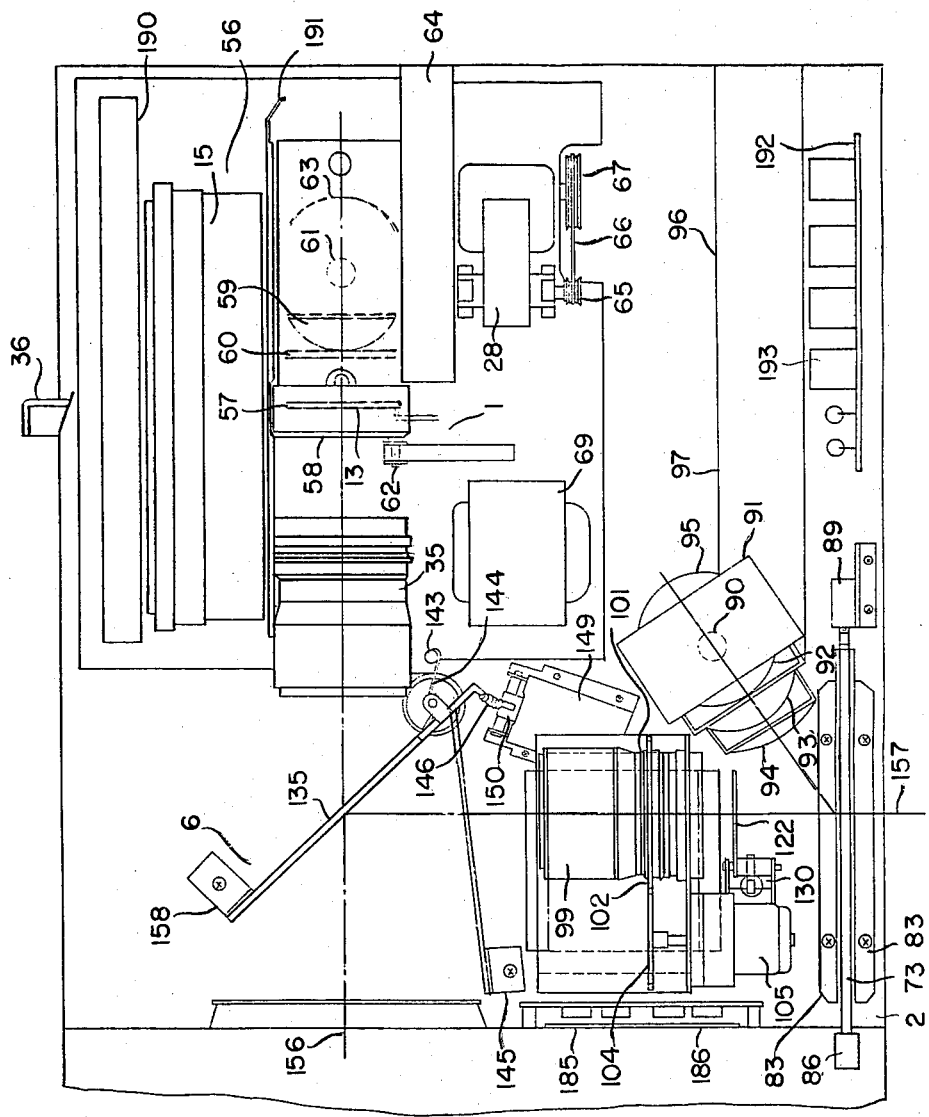
FIG. 3 is a plan view of essential parts of the machine of FIG. 1.
Figure 4:
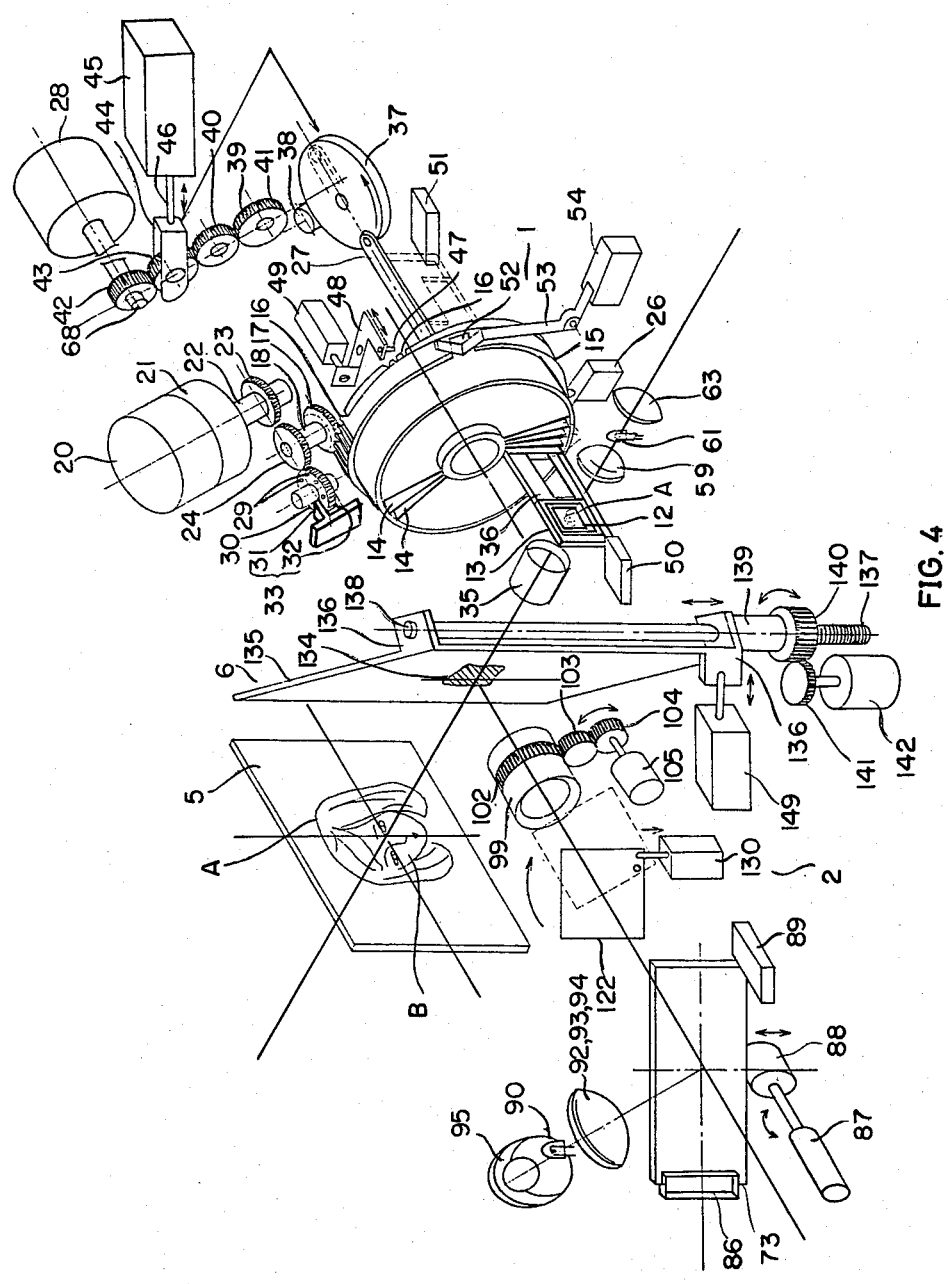
FIG. 4 is an exploded diagram of the essential parts of FIG. 3.

The coiffure projecting assembly 1, as indicated in FIGS. 3 and 4, includes slide mounts 13 for receiving a number of slides 12 carrying different coiffures with or without faces, a rotary magazine 15 having chambers each for accommodating one of a predetermined number of the slide mounts 13 (typically, 100 mounts), and a gearing section 16 which advances the slide mounts 13 in the rotary magazines 15 on the slide-by-slide basis or the frame-by-frame basis each time the rotary magazine 15 is rotated by one of gear grooves on the periphery thereof. Tightly secured on a shaft 18 are a gear 17 which mates with the gearing section 16 of the rotary magazine 15 when the rotary magazine 15 is located in its operating position and another gear 24 which mates with a gear 23 attached to a shaft 22 of a reduction gear 21 driven by a reversible motor 20 changeable in direction of rotation upon application of an electric signal to the shaft 18. The gear 24 is maintained in engaging relationship with a gear 30 having the same number of apertures 29 and rotating the same times as the gear 17. A light emitting element 31 and a light receiving element 32 are disposed so as to sandwich the apertures 29 in the gear 30 to form a rotation position detector unit 33 in conjunction with the gear 17. The rotation position detector unit 33 is adapted such that the light receiving element 32 develops a pulse each time the rotary magazine 15 is rotated by one frame or slide. To make sure that the rotary magazine 15 is rotated on the frame-by-frame basis, a position detector switch 26 is provided to developed when the rotary magazine is not in place. A mount carrier 36 is removable from the chambers 14 in the rotary magazine 15, which carrier aids in shifting one of the slide mounts 13 from its associated chamber 14 to the projection position of a lens (or lenses) 35 and reinserting the one of the slide mounts from the projection position to its associated chamber 14 in the rotary magazine 15. A first cam 37 is connected via a lever 27 to the mount carrier 36 to facilitate the insertion and removal of the mount carrier 36 into and from the rotary magazine 15. The first cam 37 is operatively associated with the first 38 of gears 38, 39 and 40 forming a reduction gear assembly 41. By way of a gear fitting 44, a gear 43 is interposed between the third 40 of the gears 38 through 40 and a gear 42 driven by a first motor 28 to link the both. The gear fitting 44 is coupled with an actuator rod 46 of #1 solenoid 45 so that the gears 40 and 42 may be brought into contacting relationship by the action of a gear 43 attached to the gear fitting 44 to permit the first motor 28 to drive the first cam 37 upon application of an electric signal to #1 solenoid 45. Under these circumstances, #1 solenoid 45 and the first cam 37 are operatively associated until the latter reaches a specific point (where one of the slide mounts 13 is either inserted into the chamber 14 in the rotary magazine 15 by way of the mount carrier 36 or removed from the chamber 14 and located at the projection position). There is provided a second cam 48 on a pin 47 snugly fitted in the gearing section 16 of the rotary magazine 15. The second cam 48 is connected to #2 solenoid so that it is driven by #2 solenoid 49 when supplied with an electric signal, permitting the pin 47 to be fitted in the gearing section 16 of the rotary magazine 15 and forcedly stopping rotation of the rotary magazine 15. A first microswitch 50 is also provided which is in closed position when the mount carrier 36 grips a selected one of the slide mounts 13 from the chambers 14 in the rotary magazine 15 and locates the same at the projection position of the lens 35. The first microswitch 50 switches on and off supply of the electric signal to #1 solenoid 45. There is further provided a second microswitch 51 which is maintained in closed position by the mount carrier 36 when the mount carrier 36 is in position opposite the projection position of the lens 35. #2 solenoid 49 is supplied with the electric signal under control of the second microswitch 51. A cutout 52 is formed in place on the periphery of the rotary magazine (e.g., the home position or "00" position of the slide mount 13 in the chamber 14 in the rotary magazine 15). A third microswitch 54 is provided which is forced into open position when an actuator 53 plunges into the cutout 52. The third microswitch 54 serves to sense the home position (i.e., "00" position) of the rotary magazine 15. Especially referring to FIG. 3, the lens 35 is held in a lamp housing 56 to which a mount holder 57 is attached to hold a particular one of the slide mounts 13 when being located at the projection position of the lens 35 by the help of the slide mount 36. Disposed between that slide mount 13 and the lens 35 is a shutter 58 which is in open position when the the slide mount 13 is embraced by the mount holder 57. A visual image on that particular slide 12 embraced by the slide holder 13 is focused and projected by means of the lens 35, a condenser lens 59 and an infrared ray absorbing glass plate 60. A lamp 61 is disposed within the lamp housing 56 such that it prevents light beams from directing outside a range of projection. A reflective mirror 63 is also disposed in the lamp housing 56 to reflect the light beams from the lamp 61 toward the condenser lens 59. There is also provided within the housing 56 a discharge duct 64 to discharge outwardly heat from the lamp 61 through the utilization of a discharge fan (not shown) driven by the first motor 28.

It is obvious that the reversible motor 20 in the above illustrated embodiment may be a conventional induction motor or a conventional DC motor. The revolutions of the reversible motor 20 are reduced to one tenth through the reduction gear assembly 21 and transmitted to the gear 19. The revolution rate of the gear 23 may be within the range of approximately 250 to approximately 300 rpm. It is noted that the first motor 28 rotates a shaft 68 carrying the gear 42 via a pulley 65, a belt 66 and a pulley 67. The lens 35 focues the visual image A on the slide 12 on the slide mount 13 embraced by the slide holder 57 onto the screen 5. There is also shown a power transformer 69. It is appreciated that the shutter 58 is rotatable about a shaft 62.

Figure 2:
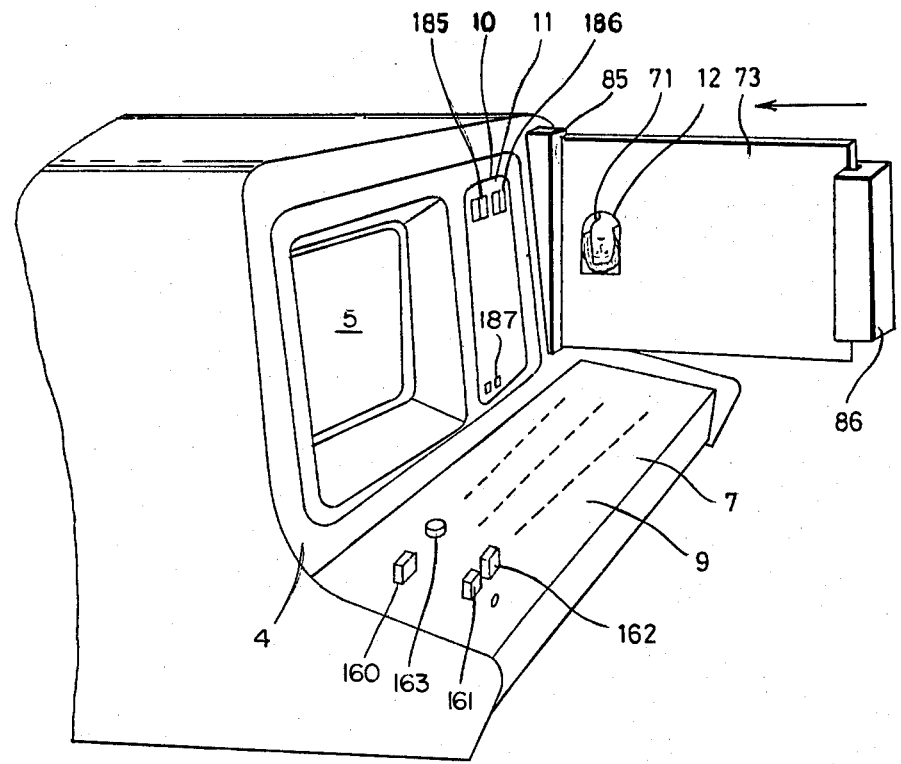
FIG. 2 is a perspective view of the image synthesizer and projector with an essential part of a photograph holder to be inserted in operating position.
Figure 5:
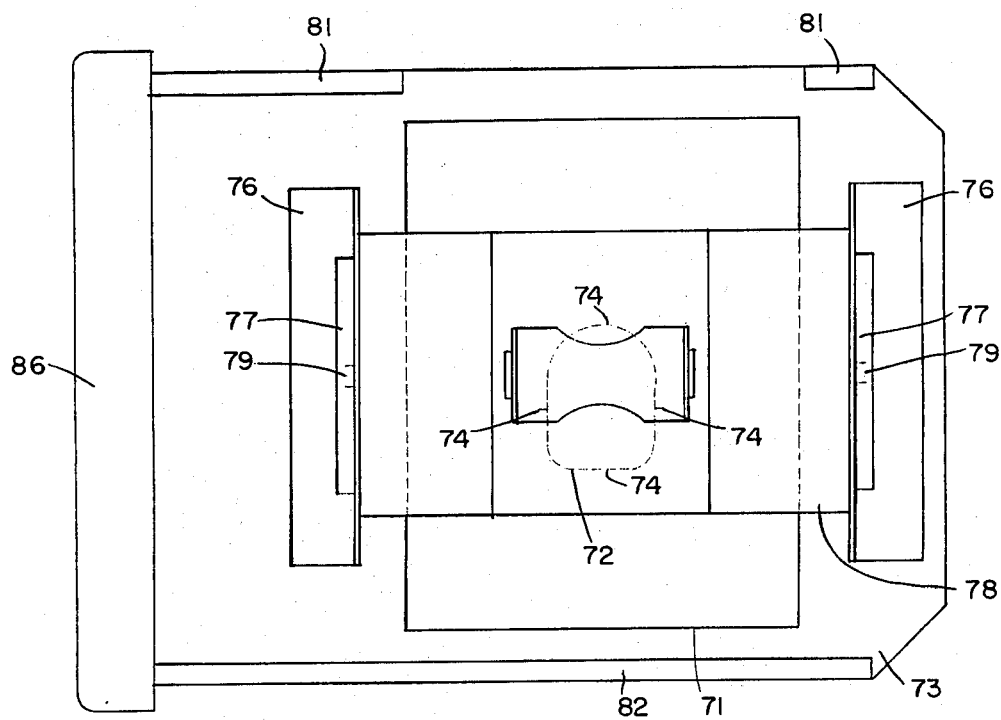
FIG. 5 is a plan view of the photograph holder of FIG. 3.
Figure 6:
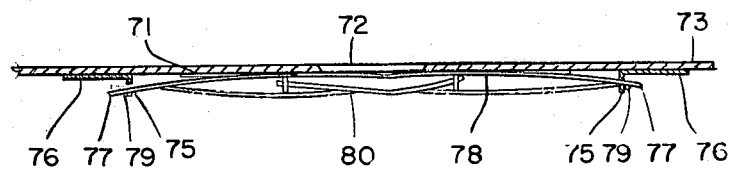
FIG. 6 is a cross sectional view of essential parts of the holder of FIG. 5.
Figure 7:
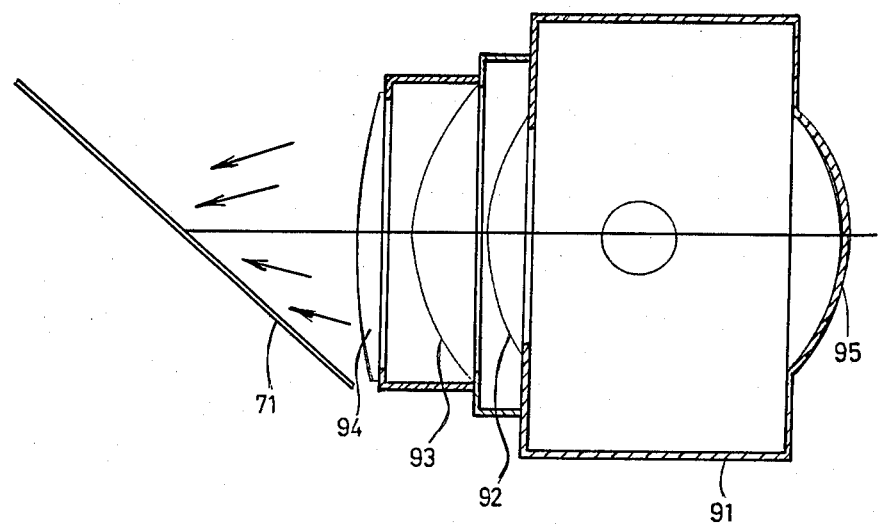
FIG. 7 is a schematic view of a light source unit shown in FIG. 3.
Figure 8:
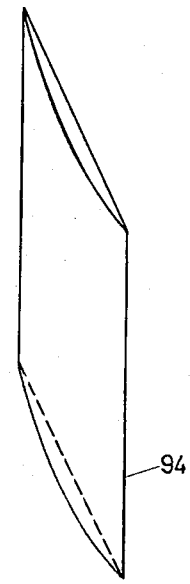
FIG. 8 is a perspective view of a cylindrical lens in FIG. 7.
Figure 9:
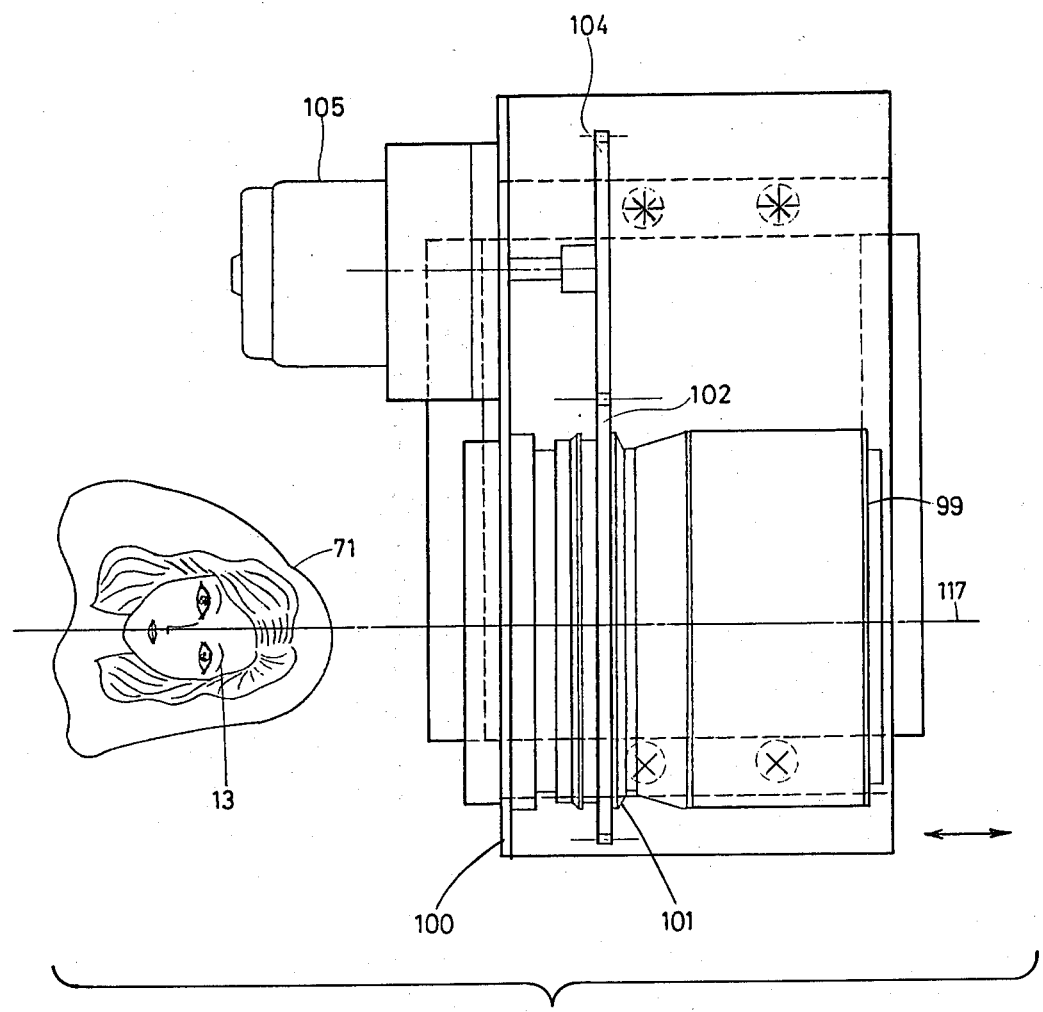
FIG. 9 is a plan view of part of the machine centered at a zoom lens.
Figure 10:
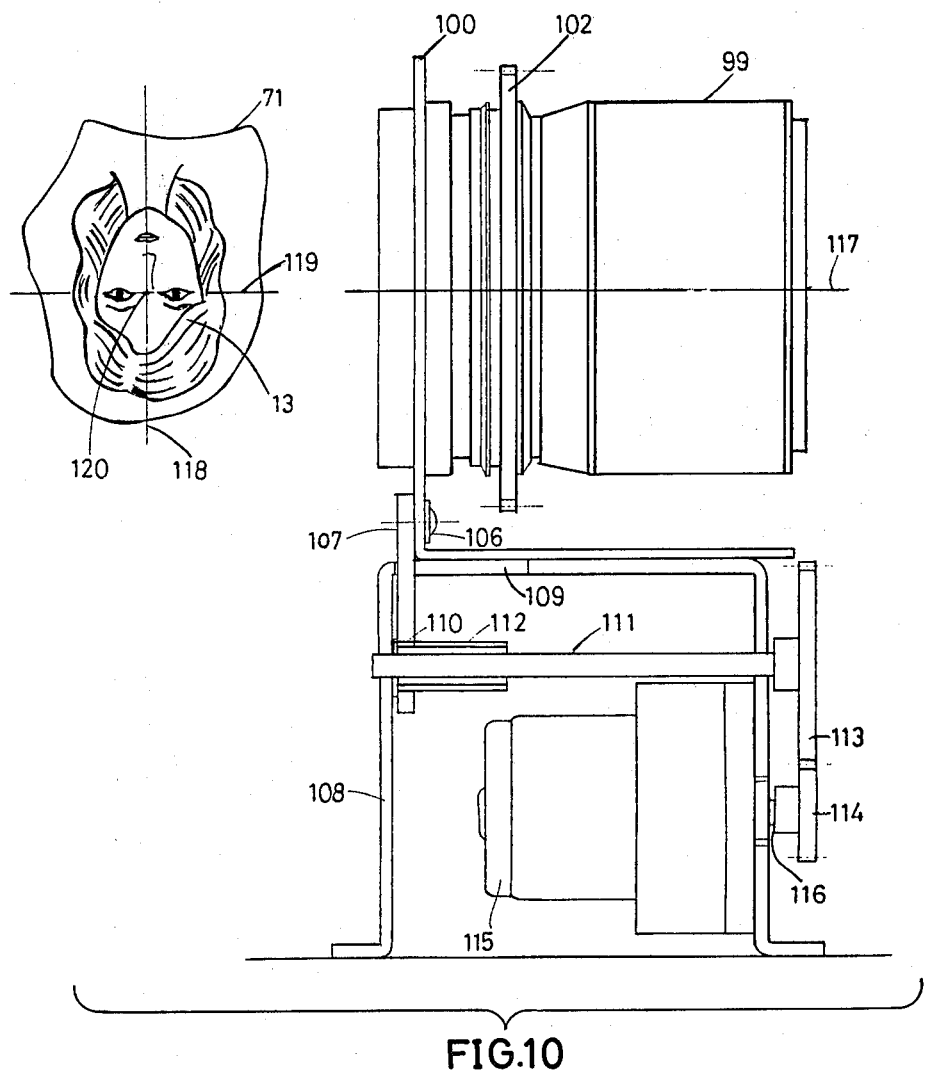
FIG. 10 is a side view of the machine of FIG. 9.
Figure 11:
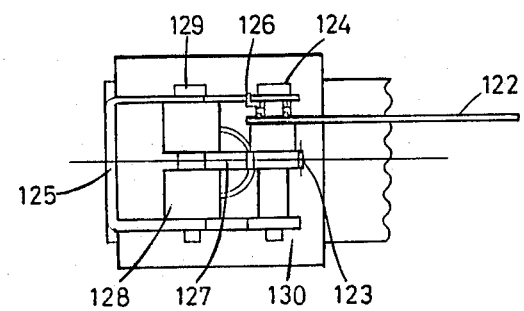
FIG. 11 is a plan view of part of the machine centered at a shutter in FIG. 3.
Figure 12:
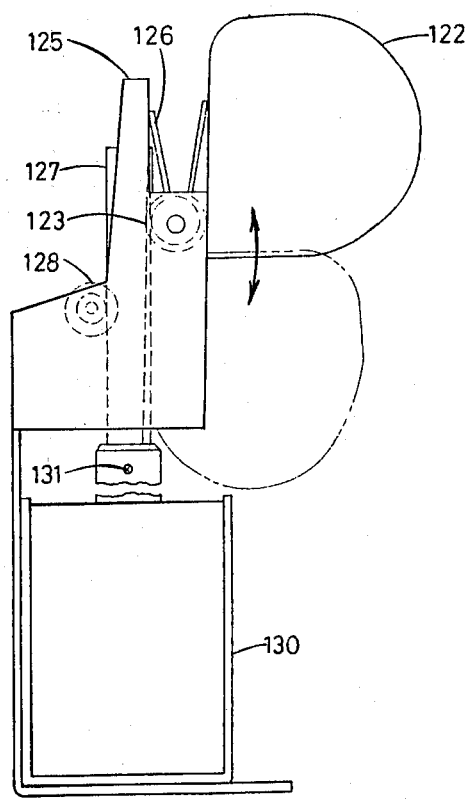
FIG. 12 is a side view of an essential part of FIG. 11.
Figure 13:
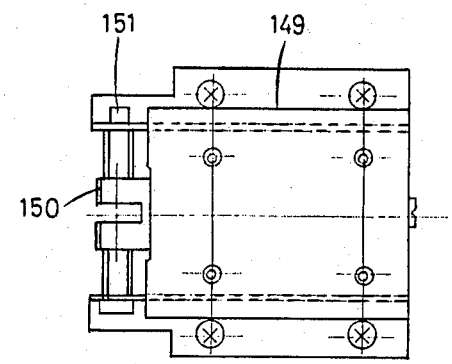
FIG. 13 is a plan view of part of the machine centered at #5 solenoid in FIG. 3.
Figure 14:
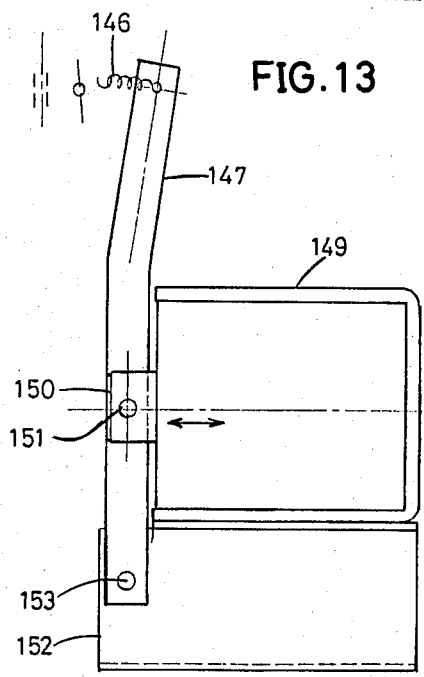
FIG. 14 is a side view of an essential part of FIG. 13.

As indicated in FIGS. 5 and 6, the face projecting assembly 2 includes a photograph holder 73 having an aperture 72 which is open to the light source to permit transmission of only the visual image B indicative of a face portion of photographs including the face of the customer and/or a coiffure. The periphery of the photograph holder 73 about the aperture 72 is treated with frosting in order that a superfluous image does not come into view on the screen 5. An alignment marking 74 is scribed to ensure proper alignment of the visual image on the photograph 71. Two opposite angles 76 having holes 75 are secured to the rear of the photograph holder 73 and a first fitting 77 which is snugly received between the holes 75 is attached to a second fitting 78 having flexibility and a width somewhat greater than the width of the first fitting 76. Stops 79 are formed on the first fitting 77 to keep the same from falling off the holes 75 in the first fitting 76. Mounted on the second fitting 78 is a handle 80 which aids in springly and forcedly securing the second fitting 78 on the photograph holder 73 in a bent shape (as denoted by the solid line in FIG. 6) and detaching the the same from the photograph holder 73 (as denoted by the phantom line in FIG. 6). Upon actuating the handle 80 the photograph 71 is inserted or removed into and from the photograph holder 73. To facilitate such insertion and removal of the photograph, a guide member 81 having a desired thickness (somewhat greater than the entire thickness of the photograph holder 73) is disposed and spaced away the top of the photograph holder 73. A second guide member 82 having the same thickness as that of the first guide member 81 is disposed at the bottom of the photograph holder 73. A guide plate 83 is disposed within the body of the apparatus as shown in FIG. 3 to guide the photograph holder 73 from an opening 85 in the front panel 4 as depicted in FIG. 2 into proper operating position via the two guide members 81 and 82. There is provided a handle 86 on the photograph holder 73 to facilitate insertion of the photograph holder 73 into the opening 85 in the front panel 4. Especially referring to FIG. 4, an eccentric cam 88 is connected to a second motor 87 rotating at a low rate below the photograph holder 73 inserted and is disposed to engage with the bottom guide member 82 on the photograph holder 73. The eccentric cam 88 permits adjustment of the level of the photograph holder 73 inserted. A fourth microswitch 89 is installed to decide whether the photograph holder 73 has been inserted in place. If not, a lamp 90 for lighting the photograph 71 such as a halogen lamp is disenergized. As shown in FIG. 7, the lamp 90 is disposed such that light beams therefrom falls outside the projection range. Disposed in front of the lamp housing 91 are a pair of condenser lenses 92 and 93 for collecting the light beams from the lamp 90 and a partially cut-away cylindrical condenser lens 94 for collecting the light beams onto the photograph 71 in the holder 73 in a direction (in the illustrated example, a horizontal direction parallel to the length of the photograph 71). The cylindrical lens 94 directs effectively the light beams toward the photograph 71 in the holder 73 even when they are obliquely incident thereon. A reflective mirror 95 is disposed behind the lamp housing 91 to reflect the beams from the lamp 90 toward the condenser lens 92. A discharge duct 96 is in communication with the interior of the lamp housing 90 to discharge heat from the lamp 90 under the influence of a discharge fan (not shown). The lamp 90, the lamp housing 91, the condenser lenses 92 and 93, the cylindrical lens 94, the reflective mirror 95 and the discharge duct 96 form a light source unit 97 together. As depicted in FIGS. 9 and 10, a zoom lens 99 is disposed by means of a first fitting 100 in front of the photograph 71 in the holder 73 being illuminated with the light source unit 97 to focus the face image B onto the screen 5 with a desired size. There is formed a gear section 102 in a zooming ring 101 which rotates the zoom lens 99. A rotary gear 104 of a third slow rotation motor 105 (e.g., a well-known geared motor with a reduction gear) is connected via an intermediate gear (not shown) which is in meshing relationship with the gear section 102. The zooming ring 101 is rotated to at a low rate by the third motor 105, permitting adjustment of the zoom lens 99. Referring to FIG. 10 in detail, the first fitting 100 is affixed to an advance plate 107 by means of screws 106. The advance plate 107 is received within a slide hole 109 in a second fitting 108 which is movable in relation to the first fitting 100. The advance plate 107 is also provided with a threaded portion 110 which meshes with a screw portion 112 of a rotary shaft 111 pivoted on the second fitting 108. A second gear 113 is secured to the rotary shaft 111 and held in meshing relationship with a gear 114 which in turn is affixed to a rotary shaft 116 slowly driven by a fourth motor 115 (for example, the above-mentioned geared motor) resting on the second fitting 103. The fourth motor 115 moves zoom lens 99 on the first fitting 100 along its optical axis 117 to achieve the focusing of the image. The optical axis 117 of the zoom lens 99 is located such that the point on the zoom lens 99 is at a stop during zooming is at the eye-to-eye center 120 on the visual image B of the face 71 of the customer (i.e., the crossing between the center line 113 of the face and the eye line 119). The slide on the particular slide mount 13 is adjusted to conform to the level of the eyes and the contour of the face on the photograph 71. A microswitch, a clutch assembly, etc., are provided as a fail-safe device when the first fitting 100 overruns under the influence of the fourth motor 115. A shutter blade 122 is interposed between the photograph 71 in the holder 73 and the zoom lens 99, which prevents the photograph image B on the zoom lens 99 from coming into view. The shutter blade 122, as depicted in more detail in FIGS. 11 and 12, is provided with a pinion gear 123 which is pivoted on a third fitting 125 via a shaft 124. Disposed within the above-mentioned shaft 124 is a spring 126 which biases constantly the pinion gear 123 in a particular direction (the direction where the shutter plate 122 does not conceal from view the image on the photograph 71 being focused on the zoom lens 99 or one denoted by the phantom line in FIG. 12). A rack 127 mating with the pinion gear 123 is held by a rack guide 128 which is rotatable on the third fitting 125 via a shaft 129. #3 solenoid 130 is screwed as shown by 131 into the rack 127 so that the shutter blade 122 is constantly held below the optical axis under the influence of the spring 126 (as seen from the phantom line in FIG. 12) not to block the visual image B on the photograph 71. When #3 solenoid 130 is energized (or when a new slide mount is selected), #3 solenoid 130 brings the shutter blade 122 into agreement with the optical axis (as shown by the solid line in FIG. 12) to hide the face image B from the screen 5. This keeps only the face image B from being projected on the screen 5 when the coiffure image A is absent on the screen 4 and eliminates the need to blink the lamp 90 and thus elongates the working life of the lamp 90.

The image synthesizing assembly 6, as shown in FIG. 4, comprises a partial mirror 135 which forms a mirror section 134 for screening the face portion of the coiffure image A in the slide 12 on the particular slide mount 13 and reflecting only the face portion of the image B on the photograph 71 in the holder 73. The partial mirror 135 is provided with a cantilever 136 which is rotatable about a rotary shaft 138 having a threaded portion 137 at its lowest end and slidable in a vertical direction. One end (the lowest) of the cantilever 136 abuts on a sleeve 139 which is also in contact with a gear 140 mating with the threaded portion 137 of the rotary shaft 138. A fifth motor 142 rotates a gear 141 and the the gear 140 so that the gear 140 moves on the threaded portion 137 of the rotary shaft 138 in a vertical direction. The result is that the cantilever 136 as well as the partial mirror 135 moves on the rotary shaft 138 in a vertical direction, thus adjusting the level of a composite boundary appearing at the forehead portion of the resulting composite image being projected on the screen 5 according to a new or selected coiffure. As is clear from FIG. 3, the partial mirror is normally urged outside the projection range of the coiffure projecting assembly 1 (as denoted by the phantom line in FIG. 3) under the influence of a spring 144 having its one end attached to the rotary shaft and its other end attached to a pin 143. The partial mirror is held in that position by a first stop 145. A rod 147 has one end connected via a buffer spring 146 to the cantilever 136 of the partial mirror 135 and is connected rotatably as a whole to a plunger 150 of #5 solenoid 149 via a shaft 151 as more clearly understood from FIGS. 13 and 14. The other end of the rod 147 is connected rotatably to a fitting 152 secured on #5 solenoid 149 by means of a shaft 153. The one end of the rod 147 is adapted to conform to a stroke necessary for rotation of the partial mirror 135 so as to magnify the leverage of a the plunger 150 of #5 solenoid 149 having a short stroke. When #5 solenoid 49 is supplied with an electric signal, the partial mirror 135 is located at an angle of 45° with the optical axes 156 and 157 between the lens 35 of the coiffure projecting assembly 1, the zoom lens 99 of the face projecting assembly 2 and the screen 5 by the action of a second stop.

As best shown in FIG. 1, within the controller 9 there is provided on the operational panel 7 a main switch 160 for switching on and off power supply to the apparatus, a switch key 161 for blinking the lamp 90 in the face projecting assembly 2, a switch key 162 for blinking the lamp 61 in the coiffure projecting assembly 1, an adjustment knob 163 for controlling the brightness of the lamp 61 in the coiffure projecting assembly 1, a takeout key 164 for insertion and removal of the mount carriers 36 into and from the chambers 14 in the rotary magazine 15, an image synthesis set/reset key 165 for forming a composite image on the screen via the partial mirror 135 upon a first switch-on signal and for rendering the partial mirror 135 in the synthesizing assembly 6 nonoperative and projecting nothing more than a coiffure image on the screen 5 upon a second switch-on signal, size adjustment keys for adjusting the size of the face image B being projected on the screen 5, an advance key and a reverse key 168 and 169 useful for focusing the face image B on the screen 5, focus keys 170 and 171 for focusing the coiffure image A on the screen 5, a memory key 172 for storing the slide mount 13 located in the chambers 14 in the rotary magazine 15, digit keys 178 of "0" through "9" for loading the identifying numbers of the slide mounts 13 in the chambers 14 in the rotary magazine 15, a selector key 174 for advancing or reversing the identifying number of the slide mount 13 stored upon actuation of memory keys 172 upon a first switch-on signal and for advancing or reversing the identifying number of the slide mount 13 in question upon a second switch-on signal regardless of the identifying number stored by the memory key 172, a clear key 175 for clearing the number determined by the memory key 172, a frame reverse key 176 for selecting the slide mounts on a frame-by-frame basis in a reverse direction, a continued selection set/reset key 177 for starting and stopping continued frame advance upon first and second switch-on signals, respectively, a cancel key 178 for cancelling error in actuation of the digit keys 173, a retrieval key 179 for advancing the slide mounts 13 frame by frame upon bare actuation thereof and for searching for the slide mount in question as selected by the digit keys upon actuation thereof subsequent to actuations of the digit keys, a display key 180 for permitting a display 186 to display the identifying number as stored, an adjustment knob 181 for adjusting the height of the photograph holder 73, an adjustment knob 182 for adjusting the level of the partial mirror 135. These two knobs are properly adjusted to bring the coiffure projecting assembly 1 and the face projecting assembly 2 into proper operating positions. Of course, the respective keys and knobs 161 through 182 are connected to an electrical arrangement as described below to achieve proper controls for the coiffure projecting assembly 1 and the face projecting assembly 2.

The visual display 11 includes, in the display window 10, a first display section 185 for indicating the identifying number of the slide mount 13 being now projected, the operating position of the rotary magazine 15 and whether the slide mount 13 is inserted into the rotary magazine 15, a second display section 186 for indicating the identifying number of the selected one of the slide mount 13 in the rotary magazine 15 as selected by the digit keys 173, a third display section 187 for indicating the continued frame advance on the slide mounts 13 and a fourth display section 189 having display elements 188 for indicating the number of memories in operation (15 memories in the illustrated example) upon actuation of the memory key 172. Therefore, the visual display 11 provides a visual display of various operation states as determined by the respective keys and adjustment knobs 161 through 182.

The above-mentioned coiffure projecting assembly 1, as shown in FIG. 3, is housed within a slide unit 190 and mounted on a platform 191 as well as the face projecting assembly 2 and the various components of the synthesizing assembly 6. A controller circuit board 192 in FIG. 3 carries the various motors, solenoids relays 192, etc., in the coiffure projecting assembly 1, the face projecting assembly 2, the synthesizing assembly, etc. The number of the display elements 188 in the fourth display section 189 is equal to the number of the memories (typically, 15 elements for 15 memories) and the number of the memories in use is visually displayed by the equal number of the display elements 188.

Figures 15, 16:
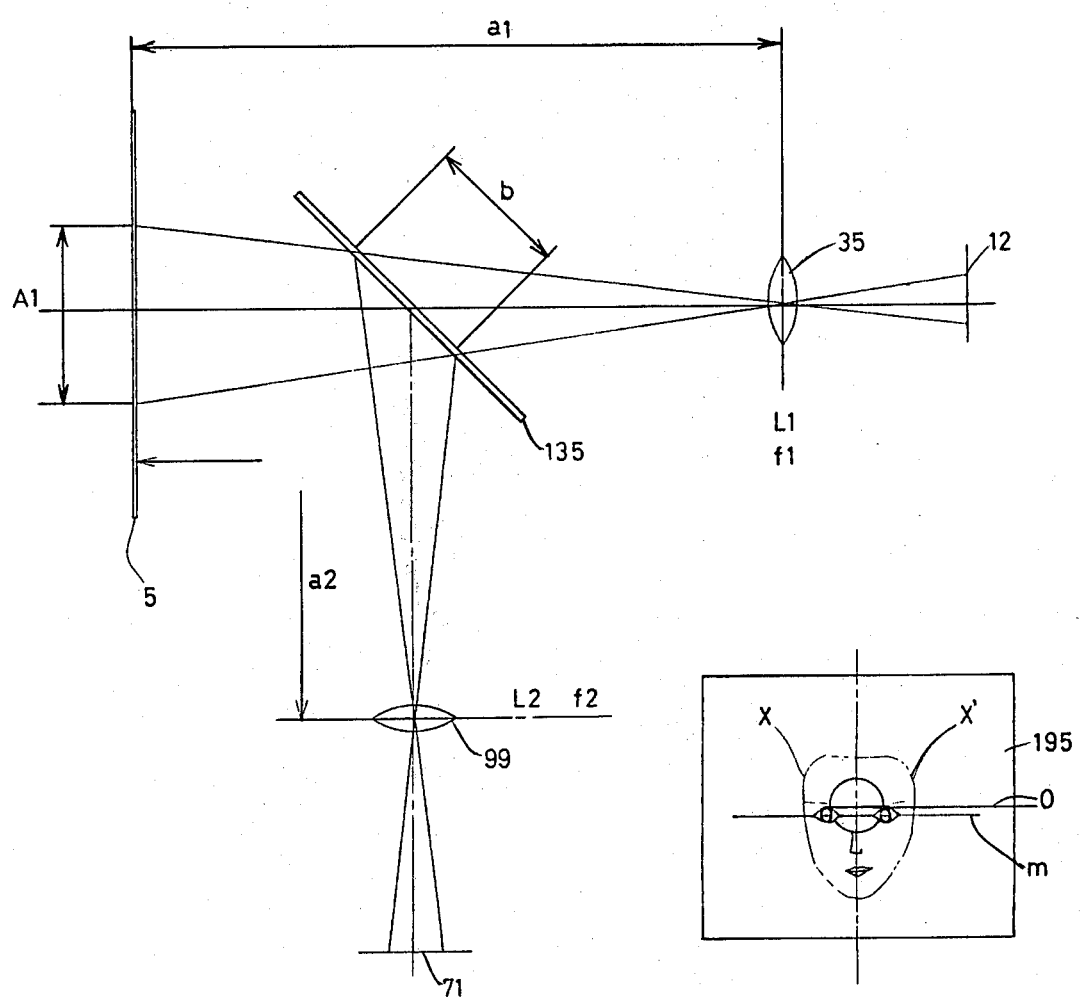
FIG. 15 is a diagram showing the relative position between a lens of FIG. 1, the zoom lens, a partial mirror and a screen.
FIG. 16 is a view of a finder screen of a camera in FIG. 1.

The relationship among the lens 35 in the coiffure projecting assembly 1, the partial mirror 135 in the synthesizing assembly 6 and the zoom lens 99 in the face projecting assembly 2 is depicted in FIG. 15. Assuming $A_1$ is the width of the undesired face portion of the coiffure image capable of being projected on the screen 5, b is the span of light to be screened on the partial mirror 135. Under these circumstances, where $a_1$ the distance between the lens 35 and the screen 5, the width of the face capable of being projected on the screen 5 should be equal to the width $A_1$ of the face portion of the coiffure image. A good quality composite image is available when the distance $a_2$ between the screen 5 and the zoom lens 99 is equal to $a_1$ and a width necessary for reflection of the face on the partial image 135 is equal to b. However, provided that $a_2$ is greater than $a_1$, the width necessary for reflection by the partial mirror 135 becomes greater so that a black shadow appears at the composite boudary in the resulting composite image or only a portion of the face image appears. On the contrary, if $a_2$ is smaller than $a_1$, then the resulting composite image will bear a background (sometimes a hairline section) of the face phtograph inside the composite boundary. The screen 5 and the respective lenses 35 and 99 are key components for obtaining a good quality composite image. With the image synthesizer and projector embodying the present invention, the relationships between the position of the slide mounts 13 and the size of the images on the slides 12 and between the position and size of the photographs 71 are determined depending upon the focal distances of the lenses 35 and 99.

FIG. 16 illustrates a finder screen of a camera for taking the photograph 71 to be inserted into the photograph holder 73 in the apparatus. While in the above illustrated embodiment the zoom lens 99 is used to adjust the image size, the zoom lens is not required in the case where the size of the face photograph is fixed. In this case, a line X—X' indicative of the face width is described on the finder screen together with a line extending downwardly from the center O and indicating the level of the eyes facilitate the taking of photographs of a fixed width. These lines define the contour of the face photograph as depicted by the phantom line. This provides the feasibility of providing many photographs with the same face width and same eye level. Of course, the finder screen 195 is also of use when taking slides of coiffures.

The circuit arrangement in the image synthesizing machine will be discussed in further detail with reference to FIGS. 17 through 21.

Figure 17:
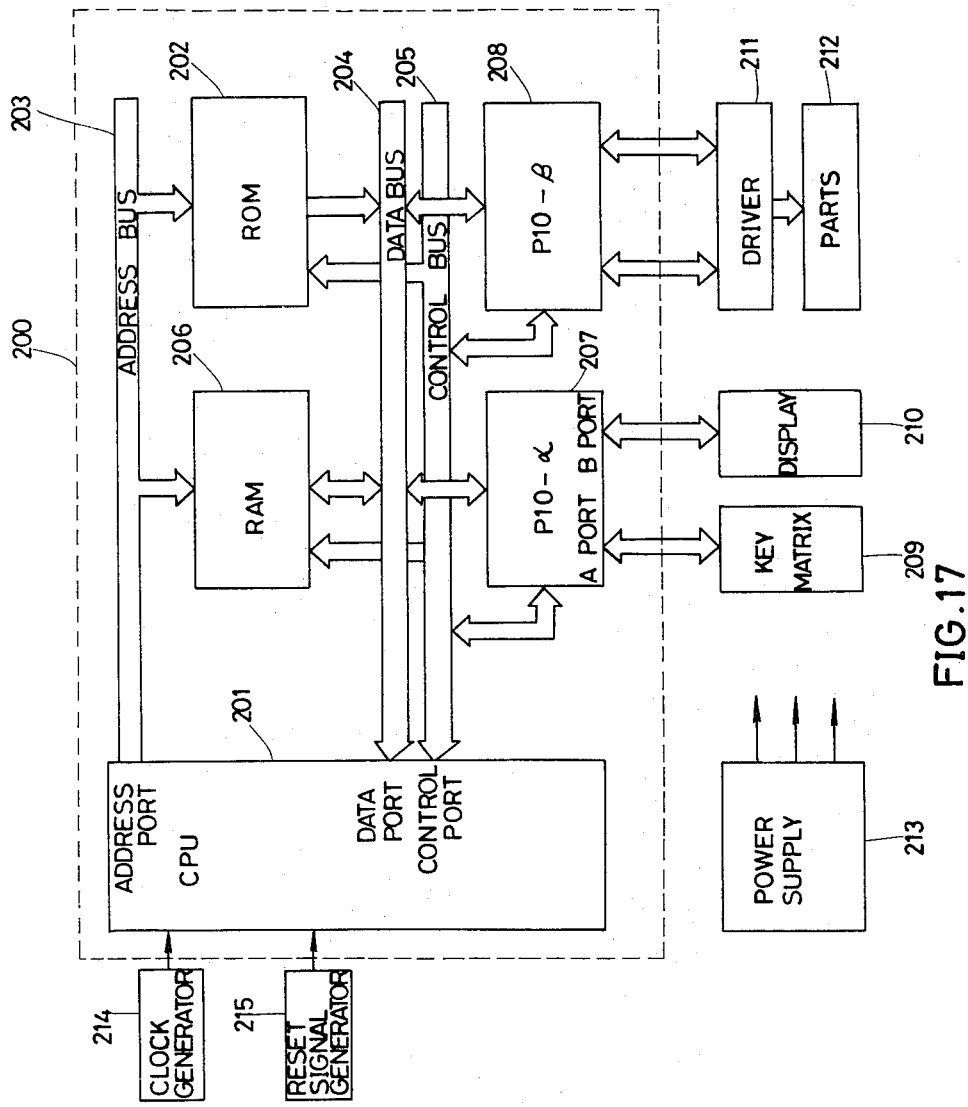
FIG. 17 is a block diagram of a controller for the image synthesizer and projector according to the present invention.

Referring first to FIG. 17, the controller 200 is implemented with a well known microcomputer technique, typically a Z-80 microcomputer chip. A central processor unit (or CPU) generally designated 201 effects the fetching and calculating of data from a particular address of a random access memory (RAM) or a read/write memory 206 while processing signals developing from an address bus 203, a data bus 204 and a control bus 205 according to a stored program in a read only memory (ROM) 202. The results of the calculations are loaded into RAM 206 and at the same time transferred into a PIO (parallel input/output interface controller)-$\alpha$ 207 and PIO-β 208 via the data bus 204 under control of the signals from the control bus 205.

A series of these operations is governed by the stored program in ROM 202, while CPU 201 processes the data from RAM 206 and supplies PIO-α 207 and PIO-β 208 with input and output signals.

PIO-α 207 and PIO-β 208 form a single component for an interface or an I/O port of CPU 201 which serves as an interface between a key matrix 209, a display 210 and other components.

The address bus 203 provides access to ROM 202 and RAM 206 in response to input signals from an address port of CPU 201. The data bus 204 is lines which are used to fetch the data from ROM 202 addressed by the address bus 203 and send the same to RAM 206 to transfer the same as input and output signals to and from a data port of CPU 201. The control bus 205 provides control signals for controlling CPU 201, RAM 206, ROM 202, PIO-α 207 and PIO-β 208 depending upon the signals from address bus 203 and the data bus 204.

The key matrix 209, as indicated in FIG. 20, is an input signal circuit including the respective key switches on the operational panel 7 of FIG. 1, the position detector switch 26, the first microswitch 50, the second microswitch 51, the third microswitch 54, the position detector 33, etc. The display 210 is a display block including the display sections 185, 186, 189 in the visual display 11 as stated previously.

A driver section 211 amplifies the signals from PIO-β 208 for driving a family of components 212 including the relays, the solenoids, the display sections, sound buzzers, etc. A power supply 218 supplies enabling voltages to the controller 200, the components 212, the display 210, etc. A clock signal generator 214 provides a train of clock signals for the controller 200 to keep addressing, loading the data, fetching and transferring the input and output signals among CPU 201, RAM 206, ROM 202, PIO-α 207 and PIO-β 208 under control of the stored program in ROM 202. A reset signal generator 215 develops reset signals for resetting the respective components of the controller 200, CPU 201, RAM 206, PIO-α 207, PIO-β 208, etc. into their initial states.

FIG. 18 is a schematic block diagram showning an array between PIO-β 208 and the components 212 via the driver section 211 and FIG. 19 is a circuit diagram showing the power supply 213 of FIG. 17 and the reversible motor 20. A buzzer 220 provides an alarming sound when a particular one of the keys on the operational panel 7 is actuated and switched on and a low "L" level signal is applied to PIO-α 207 for making sure that that particular key has been actually actuated. A relay coil 221 of #1 relay, when supplied with the enabling voltage, brings a relay contact 221a of FIG. 19 into closed position and fires the lamp 61. While a signal from PIO-β 208 is amplified by the driver section 211 and supplied to the relay coil 221, the relay contact is in closed position to energize the lamp 61. If the signal is kept from entering from PIO-β 208 into the relay coil 221, then the relay contact 221a is brought into open position, shutting the voltage supply to the lamp 61. A second relay coil 222 when in the enabled state closes a relay contact 222a of #2 relay of FIG. 19 and energizes the lamp 90. When a signal from PIO-β 208 is amplified through the driver section 211 and supplied on the second relay coil 222, the second relay contact 222a is forced into the closed position to energize and fire the lamp 90. If under these circumstances the signal from PIO-β 208 is prevented from flowing through the first relay coil 222, then the second relay contact 222a is forced into open position and the lamp 90 is deenergized. With the photograph holder 73 not in place, the fourth microswitch 89 opens a path between the driver section 211 and the second relay coil 222 and supplies no current to the second relay coil 222 even when the signal is developed from PIO-β 208 and the driver section 211 supplies output current. As a result, the second relay contact 222a is held in the open position and the lamp 90 remains nonoperable when the apparatus is in the synthesis mode with no photograph holder 73. It is not until the photograph holder 73 is located in place and the fourth microswitch 89 is switched on that the second relay coil 222 becomes energized. There is further provided an exciting coil 223 of #2 solenoid 49 for discontinuing rotation of the rotary magazine 15, an exciting coil 224 of #1 solenoid 45 for activating the mount carrier 36, an exciting coil 225 of #5 solenoid 149 for setting and resetting the partial mirror 135 and an exciting coil 226 of #3 solenoid 130 for activating the shutter blade 122 for screening the image B on the photograph 71. A fourth relay contact 227 of the fourth relay of FIG. 19, when energized, is in closed position to energize the reversible motor 20 by way of a normally closed contact 232b of a fifty relay contact 232a of the fifth relay. A third relay coil 228 of the third relay when in the excited state closes the third relay contact 228a of the third relay of FIG. 19.

Concurrently with the closing of the main switch 238, the signal from PIO-β 208 renders the third relay coil 228 conductive and the third relay contact 228 closed. On the other hand, when the main switch 238 is switched off and the power supply is shut off, a main signal detector 239 notifies port A of PIO-α 207 of the absence of a main detection signal 240. In this case, provided that the power supply is completely shut off, fan motors 28 and 241 for cooling the lamps immediately come to a stop though the lamps 61 and 90 remain at a high temperature. The result is that the lamps 61 and 90 are not sufficiently cooled, causing harmful influences to the various components. It is therefore necessary to cool the lamps 61 and 90 a short period of time after the power supply is shut off. This is accomplished by closing the third relay contact 228 of the third relay through the use of a third relay coil 228 and keeping the power supply 213 in operating state by way of the cooling fan motors 28, 241 and a transformer 242. Accordingly, the controller 200 is being supplied with the enabling voltage even when the main switch 238 is urged into the open position.

When the main detection signal is absent, CPU 201 instructs PIO-β 208 to continue supplying the signal to the third relay coil 228 and keeping the third relay contact 228a in closed position for a given period of time (say, 3 min). Thereafter, CPU 201 interrupts supplying the signal to PIO-β 208, deenergizes the third relay coil 228 and forces the third relay contact 228a into the open position, thereby shutting off all of the supply voltages.

A light emitting diode 229 indicates that the apparatus is in slide mode and a light emitting diode 230 indicates that the apparatus is in synthesis mode. These diodes are located in the display section 237 on the operational panel 7. A light emitting diode 231 indicates that the apparatus is in continued frame advance mode and is located at the display section 187.

A fifth relay coil 232 of the fifth relay switches the fifth relay contact 232a from the normally closed contact side 232b of FIG. 19 to the normally open contact side 232c upon power supply thereto, thus changing the direction of rotation of the rotary magazine 15. When it is desirable to rotate the rotary magazine 15 in a forward direction, the fourth relay coil 227 not the fifth relay coil 232 is made operable with the fourth relay contact 227a in the closed position to rotate the reversible motor 20 in a forward direction. If the rotary magazine 15 is to be reversed in direction of rotation, then exciting current is supplied to the fourth relay coil 227 to close the fourth relay contact 227a and the fifth relay coil 232 to switch the relay contact 232a from the normally closed contact side 232b to the normally open contact side 232c, thus reversing the phase of a voltage to be supplied to windings 20a and 20b of the reversible motor 20 and a phase advancing capacitor 20c and as well as rotation of the reversible motor 20.

A set of manual switches 234, 235 and 236 is used to determine the length of time where the slide mounts 13 are advanced in succession frame by frame and all of the combinations of these switches provide setting of total 8 lengths of continued frame advance modes. To achieve a desired continued frame advance mode, one of the possible 8 inputs as determined by switching on and off the switches 234, 235 and 236 is supplied to PIO-$\beta$ 208 and an input is supplied from the frame advance set/reset key 177 to CPU 201.

When the main switch 238 is closed, CPU 201 establishes a given delay time (typically, 2 sec) and supplies the signal to PIO-$\beta$ 208 upon receipt of the main detection signal 240 and the first relay coil 221 becomes operable through the driver section 211 to close the first relay contact 221a and energize the lamp 61. The reason why there is established such delay time is that high rush current flows into the cold filament of the lamp 61 upon closing the main switch 238. A warm-up circuit including a series circuit of a resistor 243 and the lamp 61 operates to pre-heat the lamp 61 during the delay time, thus avoiding possible rush current and elongating the operating life of the lamp 61. Since the controller 200 is brought into the slide mode upon the closing of the main switch 238, the lamp 90 is not energized but is sufficiently pre-heated. No rush current flows even when the apparatus is switched to synthesis mode.

It is noted that the main signal detector 239 is made up of a photo coupler 250 which includes a voltage drop resistor 246, a rectifying diode 247, a light emitting diode 248 and a photo-transistor 249. When a voltage is applied to the input side of the photo coupler 250 via the voltage drop resistor 246, a light signal is developed from the light emitting diode 248 to render the photo-transistor 249 conductive so that a voltage is developed across the resistor 251 to charge a capacitor 252 which in turn delivers a smoothed DC voltage waveform as the main detection signal. In the event that the main switch 238 is opened under these circumstances, the light signal disappears from the light emitting diode 248 in the photo coupler 250 and the photo-transistor 249 becomes nonconductive with no voltage across the resistor 251. The capacitor 252 is discharged via the resistor 251 and the main detection signal 240 bears ground level.

The first motor 28 is connected to the cooling fan motor 241 to cool the lamp 61 and the cooling fan motor 241 drives a blower unit for cooling the lamp 90. The transformer 242 converts the supply voltage into the desired enabling voltages.

In FIG. 19, the power supply 213 includes full-wave rectifying diode bridges 253 and 254, a smoothing capacitor 255 and a stabilizer 256 together with the above described transformer 242. The power supply 213 has a DC voltage source designated $V_{DD}$ which supplies DC enabling voltages to the respective components 220 through 232 via the driver section 201 and a second DC voltage source $V_{CC}$ which provides DC stabilized voltages to the controller 200, the key matrix 209 and the visual display 210. A noise filter 257 is provided to reduce noise originating from the commercial power supply (typically, 100 V) or the like.

FIG. 20 is a circuit diagram detailing the key matrix of FIG. 17. There is shown a decoder 260 for decoding the output signals from PIO-$\alpha$ 207, two digit segmented light emitting diodes (LEDs) 185 and 186, and the display section 189 including the display element 188 such as an LED for displaying the number of the memories in use and the key matrix 209.

The key matrix is 9 columns $KO_0$ through $KO_8$ by four rows $KI_0$ through $KI_3$. A switch is disposed at each of the crossings of the matrix to connect electrically its associated column and row upon actuation thereof. For example, when the switch at the crossing of $KO_0$ and $KI_0$ (corresponding to the digit key "0") is actuated, this crossing is held at a low ("L") level so that an "L" signal enters A port of PIO-$\alpha$ 207 ($A_4$ in this case) and then CPU 201 which in turn decides that the input is "zero."

The key columns $KO_0$-$KO_8$ are sequentially scanned by CPU 201 and outputted to A port $A_0$ to $A_3$ of PIO-$\alpha$ 207 and decoded via the decoder 260, thus providing an electrical representation as to which of the switches has been actuated for A port $A_0$ to $A_7$ of PIO-$\alpha$ 207 through $KI_0$ to $KI_3$. When one of the switches in the key matrix is switched on, the "L" signal is applied to A port $A_4$ to $A_7$. $KO_0$ and $KO_6$ make up a dynamic drive circuit for the display sections 185, 186 and 189 and form a matrix in combination with B port $B_0$ to $B_7$ of PIO-$\alpha$ 207. In the illustrated embodiment, $B_7$ is not used.

A switch 261 at the crossing of the column $KO_0$ and the row $KI_0$ is one that is interlocked with the digit "0" key 173. A switch 262 at the crossing of the column $KO_0$ and the row $KI_1$ is one that is interlocked with the digit "1" key 173. A switch 263 at the crossing at $KO_0$ and $KI_2$ is operatively associated with the digit "2" key and the equivalent 264 at with $KI_3$ is operatively associated with the digit "3" key 173. A switch 265 is associated with the digit "4" key 173 at the crossing of $KO_2$ and $KI_0$ and a switch 266 is associated with the digit "5" key 173 at the crossing of $KO_1$ and $KI_1$. The digit "6" key has a switch 267 at the crossing of $KO_1$ and $KI_2$, the digit "7" key has the equivalent 268 at the crossing of $KO_1$ and $KI_3$, the digit "8" key has the equivalent 269 at the crossing of $KO_2$ and $KI_0$, the digit "9" key has the equivalent 270 at the crossing of $KO_2$ and $KI_1$. Furthermore, the column $KO_2$ has a clear switch for the clear key 178 at the crossing with $KI_2$, a switch 284 associated with the takeout key 164 at the crossing with $KI_3$. The display section 185 provides "EF" and "EC", respectively, when the mount carrier 36 is removed from the rotary magazine 15 and when the rotary magazine 15 is reset.

The column $KO_3$ has a switch 271 operatively associated with the memory key 172 at the crossing with $KI_0$. This switch is to load the controller 200 with a particular value as selected by actuation of one or more of the digit keys 261 to 270 and displayed on the display section 186. When it is desired to store the value appearing on the display section 186, all that is necessary is to actuate the memory switch 271 into closed position. If a particular value is next introduced upon actuation of the digit keys 173, the display section 186 provides a visual display of the particular value and the previous contents of the memory or memories are sequentially transferred into RAM 206 in the controller 200 upon closing the memory switch 271. The foregoing procedure can be repeated further 15 times because of the 15 memories used herein. Provided that the 15 memories are full and the 16th memory operation is demanded, the contents of the first memory is cleared and renewed with the 16th information to be memorized. If the memory operation is repeated in this manner, then the first memory, the second memory and so one are sequentially renewed. This mode of operation is identified by blinking the contents of the display elements 188 in the display section 189. The display elements 188 in the display section 189 are enabled to indicate the numbers of the memories.

In the illustrated embodiment, the display section 189 comprises the display elements at the column $KO_4$ for the memories 1 to 5, those at the column $KO_5$ for the memories 6 to 10 and those at the column $KO_6$ for the memories 11 to 15. When the memory key 172 is actuated to close the memory switch 271, $KO_3$–$KI_0$ and the "L" signal are applied to A port of PIO-$\alpha$ 207 and the controller 200 sends the contents of the display section 186 to RAM 206 and fires the display element 188 in the display section 189 corresponding to the memory 1. A particular value selected by the digit keys 178 is displayed on the display section 186 and loaded into the controller 200 upon closure of the memory switch 271. At the same time the display element 189 for the memory 2 is enabled to indicate that two of the memories are full.

In the case where the foregoing can be repeated 15 times, the display element 188 displays the number of the memories up to 15. The first memory and up are sequentially erased upon the 16th actuation of the memory key 172 thereafter. In this instance all of the elements in the display section 189 are enabled. Whereas in the illustrated embodiment a total of 15 elements are used in the display section 189, a two-digit 7-segmented LED display may be used to provide a direct display of the number of the memories in operation. To this end the ROM 202 should be programmed to do so.

A switch 272 is located at the crossing of $KO_2$ and $KI_1$ for the clear key 175. When the memory switch 271 is in closed position, the memories are completely cleared by applying $KO_3$–$KI_1$ and the "L" signal to port $A_5$ of PIO-$\alpha$ 207. The controller 200 commands RAM 206, ROM 202 and CPU 201 to clear the memories within RAM 206 as well as clearing the contents of the display section 189.

A switch 285 at the crossing of $KO_3$ and $KI_2$ is operatively interlocked with the display key 180, permitting the display section 186 to display the identifying numbers of the slide mounts 13 as stored upon closure of the memory key 172. Furthermore, a switch 273 at the crossing of $KO_3$ and $KI_3$ is associated with the select key 174 for ascending or descending the identifying numbers of the slide mounts 13 up to 15 in the order of the memories 1, 2 and so on or vice versa and for advancing or reversing the slide mounts in the rotary magazine 15 frame by frame regardless of the contents of the memories. The select switch 273 effects the incrementing or decrementing the frame contents of the memories upon a first switch-on signal, initiates normal frame advance operation upon a second switch-on signal and effects incrementing or decrementing the frame contents in the memories upon a third switch-on signal and alternatively with each other. The display element 188a in the display section 189 is enabled when the frame contents are incremented or decremented in the memories and disabled when in the normal frame advance operation. It is noted that blank markings represent switches of no use in the apparatus.

A switch 275 is interlocked with the image synthesis set/reset key 165 is at the crossing of $KO_6$ and $KI_0$ for determining whether the apparatus is to in slide mode (only coiffures are projected) or synthesis mode (composite images are projected). In the embodiment, the controller 200 is reset under control of the reset signal generator 215 when the main switch 238 is closed to switch on the apparatus. The synthesis set/reset switch 275 is programmed to move toward the slide mode side in response to the reset signal from the generator 215. Upon closure of the main switch 233 the controller 200 is reset and the set/reset key 275 is forcedly urged to the slide mode. Thereafter, when the main switch is switched on, the aparatus is switched from the slide mode to the synthesis mode.

If the synthesis set/reset switch 275 is closed, the switch-on signal or the "L" signal is furnished to A port via $KO_6$ to $KI_0$ and to PIO-$\alpha$ 207 so that the controller 200 receives these signals and supplies exciting current to the coil 225 of #5 solenoid 149 as a consequence of operations of CPU 201 pursuant to the stored program in ROM 202. It follows that the partial mirror 135 is settled at the synthesis position. Then, the second relay coil 222 is supplied with exciting current to fire the lamp 90 for illumination of the photograph 71 with light. The light emitting diode 230 is also enabled to indicate in the viewing window 237 that the apparatus is in synthesis mode. At this time LED 229 is disabled to make sure that the apparatus is not in slide mode. If the synthesis set/reset switch 275 is further actuated, then the apparatus is brought into slide mode.

A switch 276 at the crossing of the column $KO_6$ and $KI_1$ is interlocked with the frame retrieval key 179. Where one or more of the switches 261 to 270 are selected and the retrieval switch 179 is actuated, the latter serves as a start key and the apparatus searches for the slide mount 13 as selected by those digit switches 261 to 270 and protected on the screen while rotating the rotary magazine 15. Upon bare actuation of the retrievel key the apparatus searches for the identifying number of the slide mount 13 displayed on the display section 185 plus one.

The frame advance operation is carried out in the following manner. Upon closing the frame advance switch 276 the input signal "L" is applied to PIO-$\alpha$ 207 via $KO_6$ and $KI_1$, permitting CPU 201 to execute a desired operation on the data from RAM 206 and ROM 202 and send the results thereof to PIO-$\beta$ 208 to drive the associated components by way of the driver section 211. As a consequence, the display section 185 displays the previous contents plus one. #1 solenoid 45 is then actuted to rotate the first cam 37 and remove the particular slide mount 36 from its associated chamber 14 in the rotary magazine 15. Thereafter, the fourth relay coil 227 is energized to place the fourth relay contact 277a in a closed position and rotate the reversible motor 20. The rotations of the reversible motor 20 are transmitted to the gearing section 16 of the rotary magazine 15 via the reduction gear 21 and the train of the gears 23, 24 and 17. The rotary magazine 15 is rotated together with the gear 30 of the rotary position detector 33 which in turn detects a pulse and sends it as an input signal to the switch 277 at the crossing of $KO_7$ and $KI_3$. This signal is applied from $KI_3$ to $A_7$ port of PIO-$\alpha$ 207. Since the frame retrieval switch 272 is to increment the current mount identifying number by one, the controller 200 commands PIO-$\beta$ 208 to disenergize the fourth relay coil 227 via the driver section 211 as long as a pulse is applied from the rotary position detector 33. Thus, the fourth relay contact 227a is in open position and the reversible motor 20 comes to a stop.

Then, the coil 223 of #2 solenoid 49 is energized to actuate #2 solenoid 49 which stops the rotary magazine 15 via the second cam 48 and the pin 47. At this time, #2 solenoid 49 remains conductive for 1-2 sec and then self returns to its home position. The coil 224 of #1 solenoid 45 is actuated to rotate the first cam 37 so as to insert the mount carrier 36 into the chamber 14 as identified by the previous number plus one. The slide mount 13 in the chamber 14 is moved toward the front of the lens 35 to project the coiffure image A.

It is understood that the coil 224 of #1 solenoid 45 remains operable for a few seconds (say, 2-3 sec) and is then mechanically locked at this position. When the first cam 37 makes substantially a half revolution, the self rotating force of the first cam 37 mechanically returns #1 solenoid 45 to its home position.

In the event that the apparatus is in the synthesis mode and the continued or reverse frame advance operation is requested but the slide mount is not in place in the projecting optical system, the coil 226 of #3 solenoid 130 is energized to insert the shutter blade 122 between the lens 99 and the photograph 71 for screening the face image B on the photograph 71 from view. This timed relationship is maintained by the switch-on signal of the first microswitch 50 or the on signal developing from the switch at the crossing of $KO_7$ and $KO_0$. In this case #3 solenoid 130 is never operable during the slide mode.

The continued frame advance set/reset switch 278 at the crossing of $KO_6$ and $KI_2$ is used during the continued frame advance mode. If the signal "L" is applied from the continued frame advance set/reset switch to $A_6$ port of PIO-$\alpha$ 207 via $KO_6$ and $KI_7$, then the continued frame advance operation is carried out on the slide mount 13 in place for the setting of time by the switches 234 to 236. After the passage of the setting of time (by the switches 234 to 236) the slide film 12 in the slide mount 13 being projected on the screen is advanced frame by frame. The respective components operate in a similar manner when the frame retrieval switch 272 is actuated.

As stated previously, the switch 279 at the crossing of $KO_6$ and $KI_3$ is operatively interlocked with the reverse frame key 176. When the reverse frame switch 279 is actuated, the signal "L" is supplied to $A_7$ port of PIO-$\alpha$ 207 via $KI_3$ to decrement the film number of the slide mount 13 being currently projected by one and provide that decremented value on the display section 185. Exciting current flows through the coil 224 of #1 solenoid 45 for a few seconds (say, 2-3 sec) so that the mount carrier 36 moves away from the chamber 14 in the rotary magazine 15. The second microswitch 51 makes sure that the mount carrier 36 is out of the chamber and sends its output to the key matrix. This signal renders the fourth relay coil 227 operable and the fourth relay contact 227a open. The fifth relay coil 232 is then energized to move the fifth relay contact 232a toward the normally open contact side 232. If the frame retrieval switch 276 is in the closed position, the enabling voltage is supplied to the joint of one end of the coil 20b and the coil 20a to rotate the reversible motor 20 in a reverse direction. As a result, the rotary magazine is also rotated in a reverse direction together with the gear 33. When this occurs, the rotary position detector 33 senses a pulse and sends it to the matrix switch 277. When the reverse frame switch 279 is switched on, CPU 201 rotates the rotary magazine 15 and the gear 30 until the film identifying number of the slide mount 13 in place is decremented by one and a pulse is developed. If this pulse is sensed, the fourth relay coil 227 is disenergized to open the fourth relay contact 227a and discontinue rotating the reversible motor 20. The fifth relay coil 232 is also disenergized to switch the contact 232a to the normally closed contact side 232b. Instead, the coil 223 of #2 solenoid 49 is energized to stop the rotary magazine 15. Under these circumstances the exciting coil 224 of #1 solenoid 45 is energized to move the mount carrier 36 in such a way as to insert the slide mount 13 into the optical path, particularly in front of lens 35. The reverse frame mode is very useful to accelerate frame retrieval since CPU 201 may compare the number of the film 12 being projected and the number of the film to be retrieved and decide whether the slide film 12 is inserted into the projection position in a forward direction or a reverse direction.

It is noted that the micro switch 50 is off except when the mount carrier 36 is in place where the slide film 12 is properly projected. CPU 201 does not accept any signals from the digit keys 261 to 270, the memory switch 271, etc., even when they are actuated under these circumstances. With the microswitch 50 in the off position, the display section 186 displays "EF", indicating that the mount carrier 36 is not in place. The apparatus is made completely nonoperable to avoid an improper timed relationship between the electric signals and the internal mechanism. Immediately when the microswitch 238 is switched on, the display section 186 displays "EF" as long as the above stated situation is continued. If the mount carrier 36 is properly located, "EF" disappears from the display section 186 and the rotary magazine 15 is returned to its home or "00" position.

The first microswitch 50 is located at the crossing of $KO_7$ and $KI_0$ in the matrix of FIG. 20, the second microswitch 51 at the crossing of $KO_7$ and $KI_1$, and the third microswitch 54 at the crossing of $KO_7$ and $KI_2$. The third microswitch senses that the main switch 238 is switched on and the rotary magazine 15 is rotated to its "00" position. A switch 277 is supplied with the output signal from the rotary position detector 33 and a switch 26 senses that the rotary magazine 15 is not in place in the apparatus. An input section 280 is supplied with the main detection signal 240. The display section 185 comprises two digit 7-segmented LEDs for displaying the identifying number of the slide film 12 and the display section 186 similarly comprises two digit 7-segmented LEDs for displaying the number of the memories to be used (as specified by the digit keys 173). The memory display section 189 comprises the LED display 188 for displaying the number of the memories which are already loaded. The display section 188a includes an LED for displaying whether the apparatus is in frame advance mode in connection with the memories or in the normal frame advance mode.

If the rotary magazine 15 is not in place but the main switch 238 is switched on, then the position detector switch 26 is not switched on so that the display section 185 displays the alarming signal "EF" and notifies that the rotary magazine 15 is not in place. Under these circumstances, CPU does not accept any signal from the key matrix including the digit keys 261 to 270, the memory switch 271, etc. Provided that the mount carrier 36 is moved outwardly to switch on the second microswitch 51 and the rotary magazine 15 is located in place, the position detector switch 26 is forced into the on position and the rotary magazine 15 is rotated to the "00" position. To make sure that the rotary magazine is not mechanically locked and that it is properly located, it is not until the rotary magazine 15 is somewhat rotated in a forward direction or a reverse direction and one or more pulses are developed from the rotary position detector 33 that the rotary magazine 15 is reset to the "00" position. If the rotary magazine 15 is out of place during retrieval, the foregoing procedure is carried out so that the display section 186 displays "EC" and the rotary magazine 15 is reset to the "00" position after the rotary magazine is somewhat rotated and the rotary position detector 33 develops a pulse.

The respective switches 261 to 279 in the key matrix are more particularly shown in FIG. 21.

The reversible motor 20 is rotated with AC 100 V voltage which is switched through the fourth relay contact 227a or the fifth relay contact 232a. However, an abnormal voltage such as a surge voltage may be developed and applied to the controller 200 or the input and output circuits as line noise when the fourth relay contact 227a or the fifth relay contact 232a is switched on and off. The apparatus is programmed to avoid such noise as follows.

When the fifth relay contact 232a is normally closed, no noise such as a surge voltage occurs. However, a remarkable noise is developed at the moment where the fifth relay coil 232 is energized and the fifth relay contact 232a is switched to the normally open contact side 232c. More particularly, noise occurs at the moment where the fifth relay contact 232a is released from the normally closed contact side 232b (e.g., 0.7 msec) and the moment where the fifth relay contact 232a is turned to the normally open contact side 232c (e.g., 0.7 msec). Therefore, the fifth relay coil 232 is energized to switch the fifth relay contact 232a before the fourth relay coil 227 is energized and the fourth relay contact 227a is brought into closed position. Then, the fourth relay contact 227 is closed according to the stored program. This programming remarkably reduces noise and malfunction of the controller 200 and the input and output circuits.

The results of the inventors experiments reveal that it took 3 msec or so to switch the fourth relay contact 227a upon supplying conduction current to the fourth relay coil 227. provided that a time lag of 20 msec–50 msec was set up, it was in 20 msec–50 msec that the fourth relay contact 227a was opened and the fifth relay contact 232a was switched from the normall open position 232c to the normall closed position 232b. It is more preferable to use a semiconductor switching element such as a triac as a zero volt switching element instead of the fourth relay in order to reduce noise.

Figure 22:
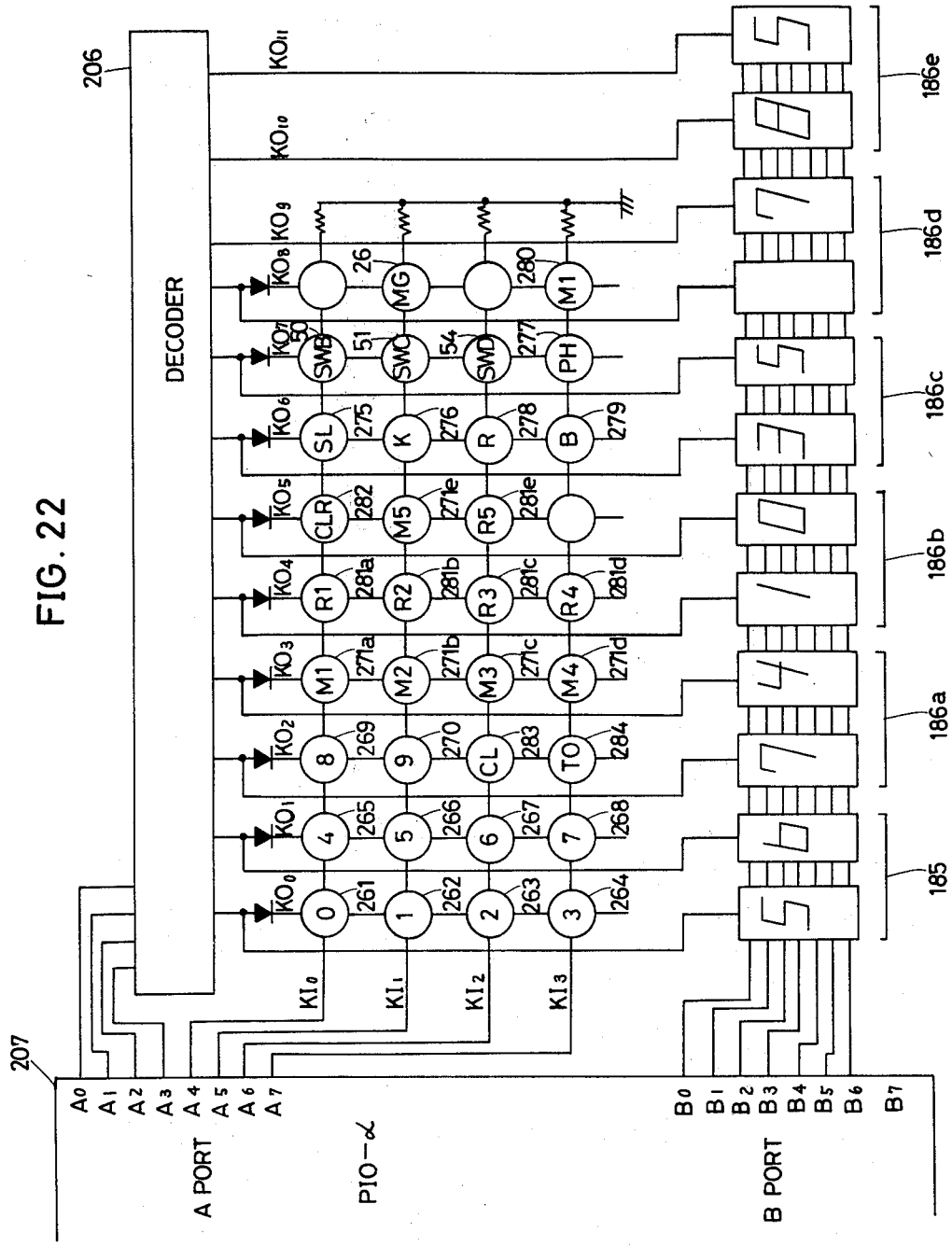
FIG. 22 is a circuit diagram of a modification in the key matrix of FIG. 20.

FIG. 22 shows another embodiment of the key matrix, wherein the memories are somewhat different from those in FIG. 21 and the stored program in ROM 202 in the controller 200 is modified. Similar designations in FIG. 22 represent components similar to those in FIG. 20.

In FIG. 22, the columns $KO_3$, $KO_4$ and $KO_5$ differ from those in FIG. 20 and the display section 186 comprises five sets of a two-digit 7-segmented LEDs 186a, 186b, 186c, 186d and 186e rather than the two-digit 7-segmented LED for displaying the number of the memories. This is due to the fact that there are five different storage memories: the display 186a for the first memory; the display 186b for the second memory; the display 186c for the third memory; the display 186d for the fourth memory; and the display 186e for the fifth memory.

When it is desired to store the number of the slide film 12 displayed on the two-digit 7-segmented LED or a particular value introduced via the digit keys 173, a memory switch 271a at the crossing of $KO_3$ and $KI_0$ is actuated so that the first memory is ready to store either of these values.

When one of these values is to be stored in the second memory, a memory switch 271b at the crossing of $KO_3$ and $KI_1$. A memory switch 271c at the crossing of $KO_3$ and $KI_2$ is actuated to select the third memory as a storage memory. The fourth and fifth memories are selected by actuating a memory switch 271d at the crossing of $KO_3$ and $KI_2$ and the equivalent 273e at the crossing of $KO_5$ and $KI_1$, respectively. Concurrently with loading a selected one of the memories, the display sections 186a–186e display that selected memory.

Each of the memories is recalled as follows: the first memory is recalled upon actuating a recall switch 281a at the crossing of $KO_3$ and $KI_0$; the second memory upon actuating a recall switch 281b at the crossing of $KO_4$ and $KI_1$; the third memory upon actuating a recall switch 281c at the crossing of $KO_4$ and $KI_2$; the fourth memory upon actuating a recall switch 281d at the crossing of $KO_4$ and $KI_3$; and the fifth memory upon actuating a recall switch 281e at the crossing of $KO_5$ and $KI_2$. In this manner, the contents of the selected memory are fetched and the rotary magazine 15 is rotated in such a way as to bring the the identifying number of the slide mount 13 into agreement with the fetched contents of the memory. If both agree, the slide film of that number is projected. Thus, loading and recalling the memories are achieved by one-touch or simple actuations of the switches.

It is noted that a switch 282 at the crossing of $KO_5$ and $KI_0$ is a clear switch for canceling the contents of the first through fifth memories. In addition, these memory switches 271a through 271e, the recall switches 281a through 281e and the clear key 282 are all disposed on the operational panel 7.

Operation of the above described image synthesizer and projector machine will now be described by reference to flow charts of FIGS. 23 through 29.

Figure 23:
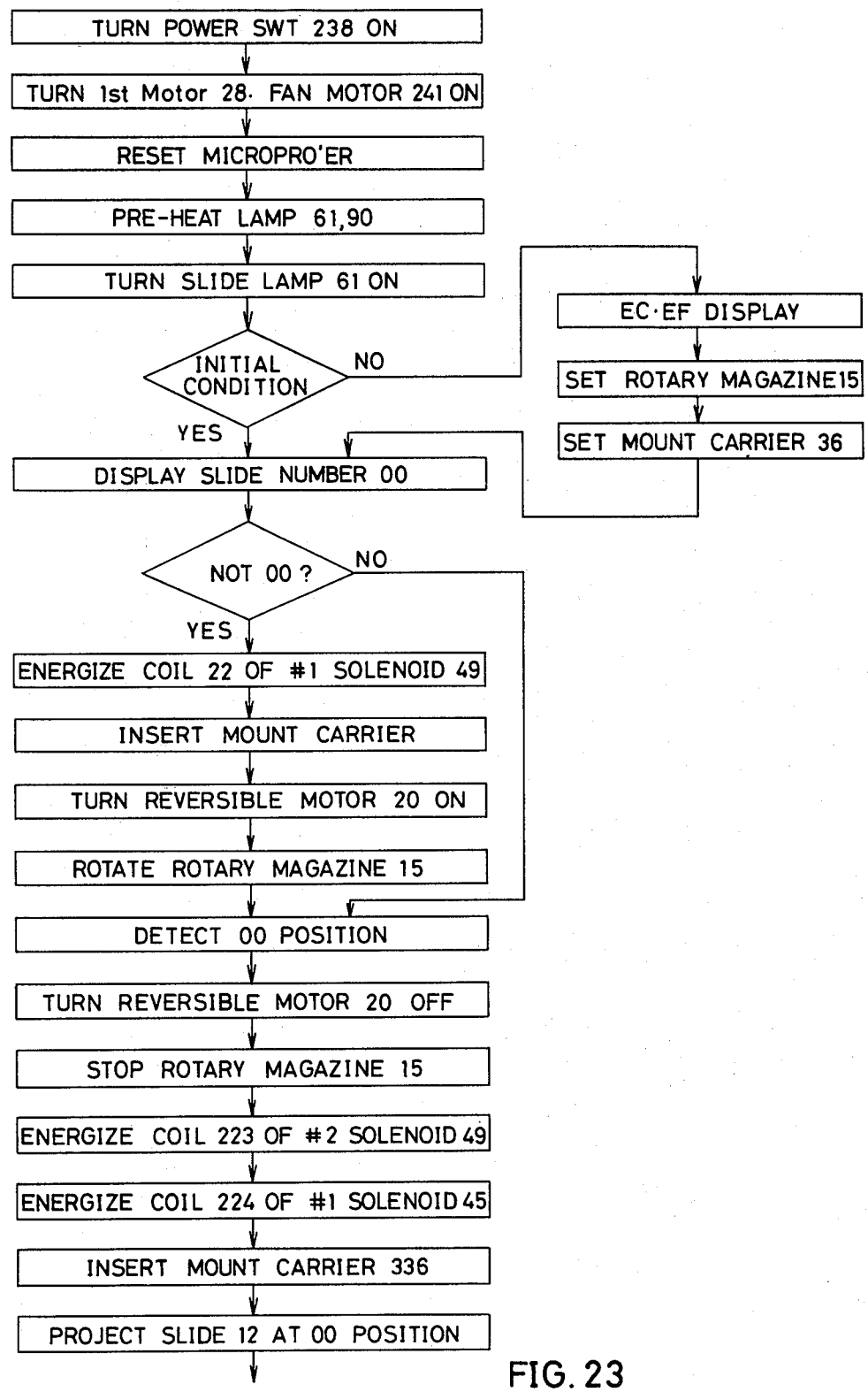
FIGS. 23 through 29 are flow charts for explanation of the image synthesizer and projector according to the present invention.

A sequence of operating events between switching on the main switch 160 and the power switch 238 and sensing the "00" position of a desired slide mount 13 for projection is more fully discussed by reference to a flow chart of FIG. 23. If the main switch 160 is manually operated to switch on the power switch 238, then the first and second motors 28 and 241 become operable for driving cooling fans for the slide illumination lamp 61 and the photograph illumination lamp 90. The lamps 61 and 90 are warmed up at this time. Since rush current flows when the lamp 61 is energized as soon as the power is switched on, the lamp 61 is warmed up for 2 sec and then energized. The reset signal from the reset signal generator 215 clears RAM 206 and the memories in the controller 200 as well as clearing the synthesis mode, the continued mode, the memory frame advance mode, etc.

The display section 185 displays an error condition "EC" unless the rotary magazine 15 is located in place. Any signals from the keys 161 through 179 are not accepted. Where the rotary magazine 15 is in place but the mount carrier 36 is still in wrong position, the display section 185 displays "EF" indicating that the mount carrier 36 is in wrong position. The display section 185 displays neither "EC" nor "EF" once the rotary magazine 15 and the mount carrier 36 are both in proper position. The display section 185 displays the setting number "XX" of the slide 12. It is noted that the display section 185 displays "EC" or "EF" and the apparatus accepts no signals from the respective keys if the rotary magazine 15 or the mount carrier 36 is reset for any reason.

If the display section 185 displays the number of the slide 12, then the coil 224 of #1 solenoid 45 is energized so that the mount carrier 36 moves out of the rotary magazine 15 and the reversible motor 20 becomes operable to rotate the rotary magazine. When the third microswitch 54 is in on position or when the slide is in the setting position at the beginning, that slide is permitted to be projected. On the other hand, when the third microswitch 54 is in the off position or when the slide 12 is not in the setting position, the rotary magazine 15 is rotated until the third microswitch 54 is switched on. If the third microswitch 54 is switched on, the reversible motor 20 discontinues rotating and prevents the rotary magazine 15 from rotating. Then, the coil 223 of #2 solenoid 49 is energized to insert the mount carrier 36 into the chamber 14 in the rotary magazine 15 and remove the slide 12 from the setting position ("XX") for projection.

The synthesis mode by which the coiffure image A is combined into the face image B is set or reset in the following manner as will be more clear from flow charts of FIGS. 24 and 25.

Figure 24:
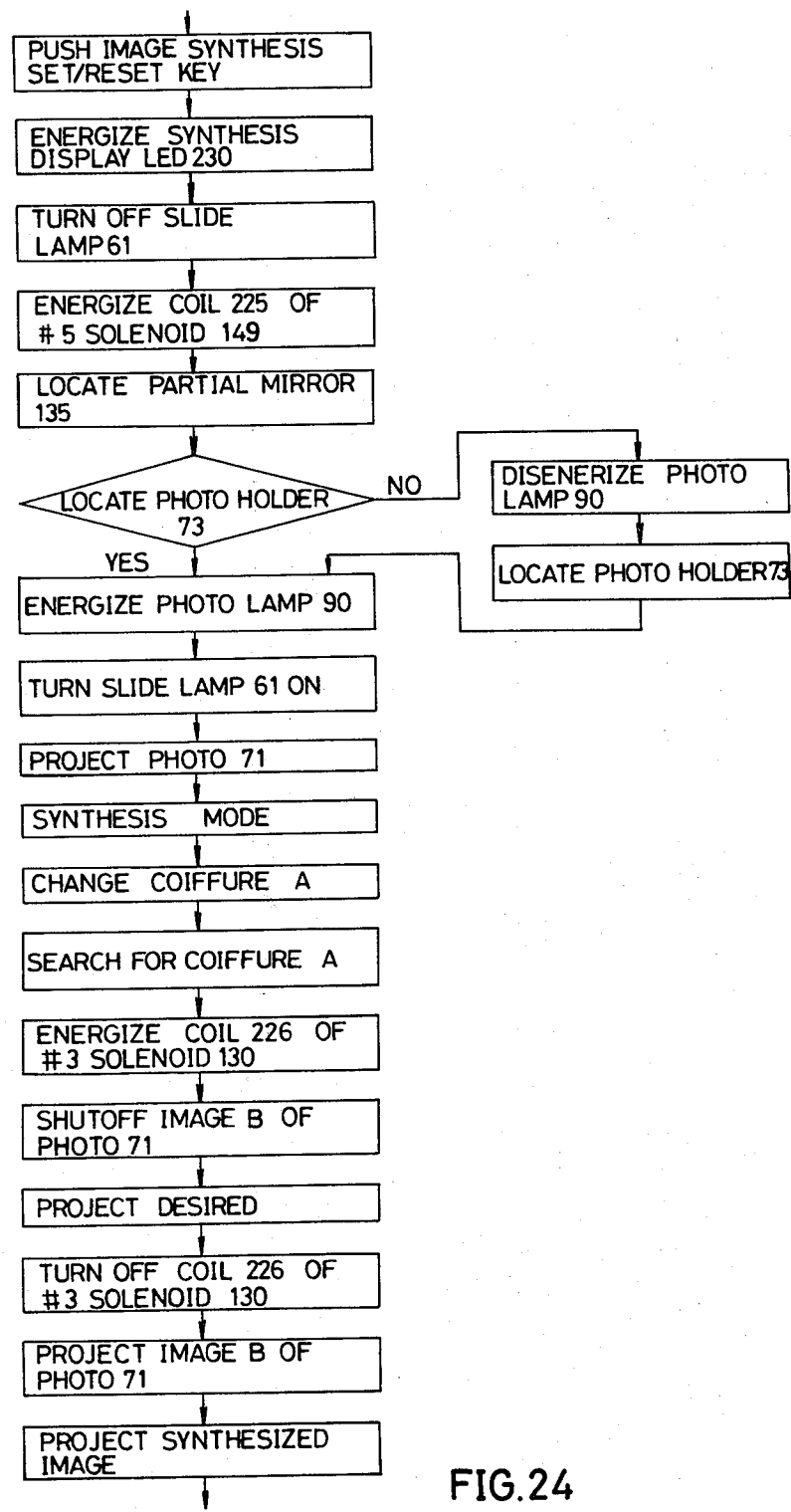

Referring to FIG. 24, actuation of the synthesis set/reset key 165 switches the apparatus from slide mode to synthesis mode. The light emitting diode 230 is energized to indicate that the apparatus is now in synthesis mode, whereas the light emitting diode 229 is disabled in connection with slide mode. The lamp 61 for the slide 12 is also disenergized. #5 solenoid 149 becomes conductive to locate the partial mirror 135 in proper position. When the photograph holder 73 is not in place, the fourth microswitch 89, in off position, does not energize the lamp 90 which in turn is in the warm-up state. However, when the photograph 73 is in place, the fourth microswitch 89 is switched on to energize the lamp 90. The lamp 61 is also energized so that both the slide 12 and the photograph 71 are projected to achieve synthesis mode. In order to modify the coiffure during synthesis mode, the apparatus searches for a desired one of the slides 12. The coil 226 of #3 solenoid 130 is excited to conceal the photograph image B behind the shield blade 122. Once the desired slide has been retrieved and projected, current supply to the coil 226 of #3 solenoid 130 is inhibited to set the shield blade 122 free from operating position. Therefore, an composite image inclusive of the photograph image 71 is projected on the screen 5. It is noted that the lamps 61 and 90 are in disabled state and a black background appears on the screen 5 when the partial mirror 135 is to be set or reset.

Figure 25:
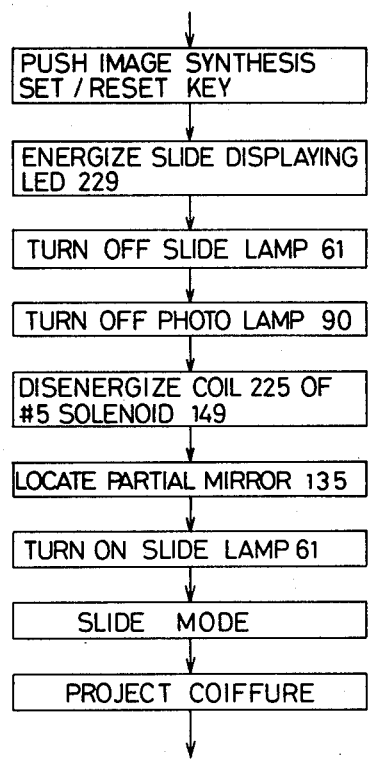

The manner by which the synthesis mode is cleared or reset is illustrated in a flow chart of FIG. 25. When the synthesis set/reset key 165 is actuated to switch from the synthesis mode to the slide mode, LED 231 is energized to indicate that the apparatus is now in the slide mode and an LED 230 indicating the synthesis mode is deenergized. The illuminating lamp 61 for the slides 12 is in warm-up state and the lamp 90 for illuminating the photograph 71 is also in warm-up state. Current supply to the coil 225 of #5 solenoid 149 is interrupted so that the partial mirror 135 is returned to home position. Thereafter, the lamp 61 for illuminating the slides 12 are energized and the respective coiffures in the slides 12 are projected on the screen 5. The above procedure may be effected anytime while the apparatus is in use. Input signals may be accepted when the first microswitch 50 is switched on.

Figure 26:
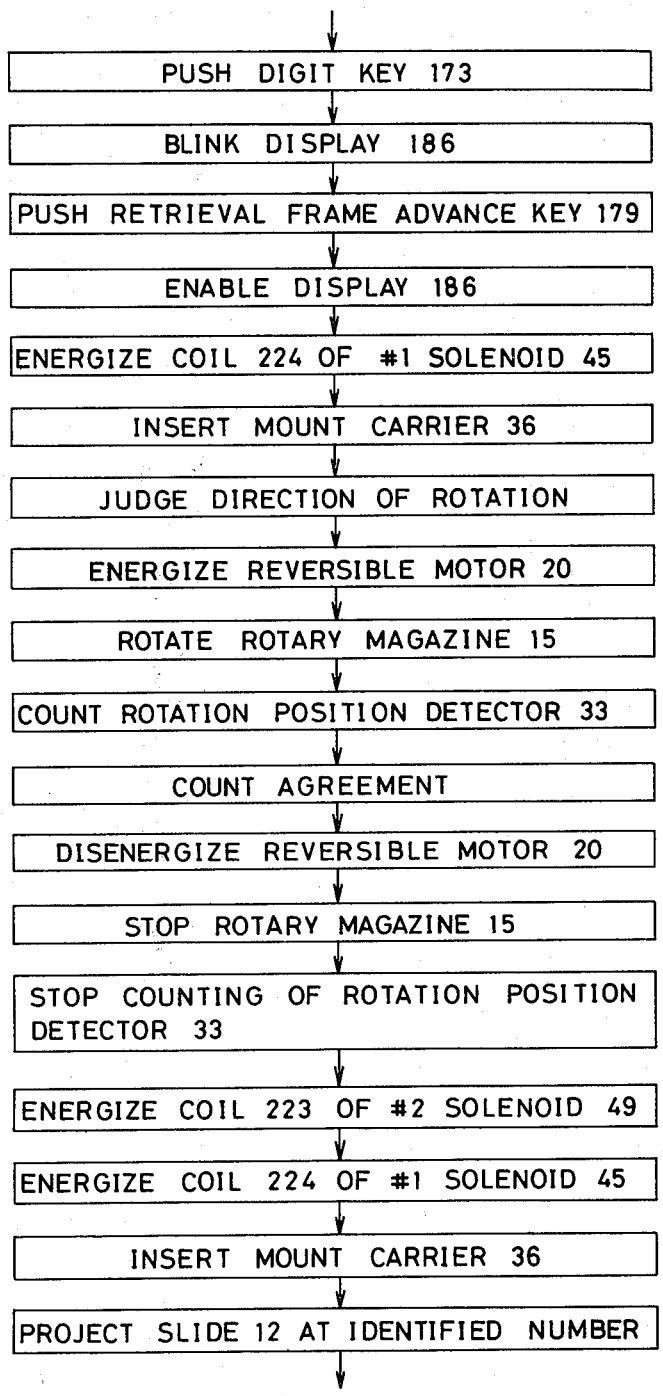

A flow chart of FIG. 26 shows events from retrieval of the slide mounts 13 to projection of the slides 12. The keys used during this procedure are the memory key 172, the digit keys 173, the select key 174, the reverse frame key 176, the continued frame advance set/reset key 177 and the retrieval frame advance key 179. Memory operation triggered by actuation of the memory key 172 will be discussed hereafter.

The above procedure is carried out when the digit keys 173 are actuated or when the select key 174, the reverse frame key 176, the continued frame advance set/reset key 177 and the frame retrieval key 179 rather than the digit keys 173 are actuated. If the digit keys 173 are actuated, the apparatus will operate as follows. When the digit keys 173 are actuated to introduce a particular identifying number of the slide mounts 13, the display section 186 displays that number in a blinking manner. The blinking display on the display section 186 provides an alarming signal, indicating the operator to operate the memory key 172, the reverse frame key 176, the continued frame advance set/reset key 177, etc., and proceed with the next succeeding step in the stored program.

Thereafter, if the retrieval frame advance key 179 is actuated, the coil 224 of #1 solenoid 45 is supplied with exciting current. The mount carrier 36 moves away from the chamber 14 in the rotary magazine 15 and CPU 201 in the controller 200 compares the number of the slide mount 13 now in place and the number of the specified slide mount 13 for deciding whether the rotary magazine is to be rotated in a forward direction or a backward direction. The reversible motor 20 is driven to rotate the rotary magazine 15 in a selected one of the two directions. The revolutions of the rotary magazine 15 are monitored by the rotary position detector 33. If the counts of pulses by the rotary position detector 33 agrees with the count indicative of the specified number, then the reversible motor 20 is disenergized so that the rotary magazine 15 comes to a stop and rotary position detector 33 discontinues counting the pulses. The coil 223 of #2 solenoid 49 is energized so that the rotary magazine 15 comes to a stop immediately. As well, the coil 224 of #1 solenoid 45 is energized to insert the mount carrier 36 into the chamber 14 in the rotary magazine 15 and pick up the specified slide mount 13. It follows that the slide 12 on the slide mount 13 is projected on the screen 5.

Subsequent to actuation of the digit keys 173, the reverse frame key 176 rather than the frame retrieval key 179 is actuated so that the slide mount 13 with the specified number is extracted and the slide 12 on that slide mount 13 is projected on the screen. Upon a further actuation of the reverse key 176 the slide 12 of the previous number minus one is projected on the screen. In the case that the continued frame set/reset key 177 is actuated after actuation of the digit keys 173, the slide 12 of the specified number is extracted in the same manner as with the frame retrieval key 179 and projected on the screen. Thereafter, the slide mounts 12 are stepped one by one.

Figure 27:
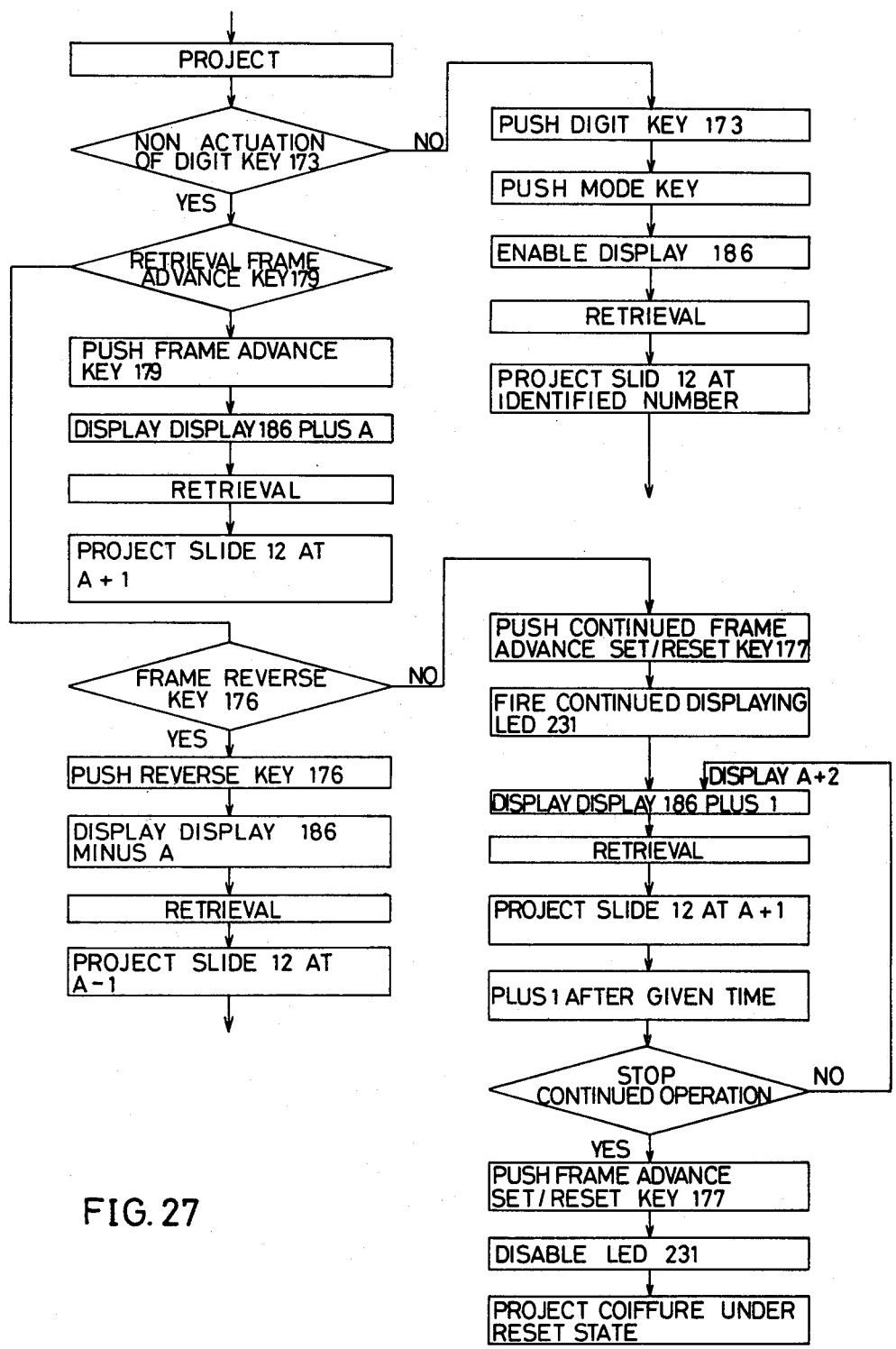

When the frame retrieval key 179, the reverse frame key 176 and the continued fram advance set/reset key 177 are respectively actuated, the apparatus operates according to a flow chart of FIG. 27. At first, upon actuation of the frame retrieval key 179 alone the display section 185 displays the identifying number of the slide mount 13 in place plus one and the slides are advanced in accordance with the procedure of retrieval. The number of the slide currently in place is visually projected.

When the reverse frame key 176 is actuated, the display section 185 displays the previous number of the slide mount minus one. Therefore, the slide mounts 13 are reversely moved.

When the continued frame advance set/reset key 177 is actuated alone, LED 231 as to continued mode is fired and the display shows the previous number of the slide mount 13 plus one. The procedure of frame advancing is carried out in the same manner as shown in the flow chart with regard to the retrieval and the next succeeding slide mount is projected. This procedure lasts for a given period of time. Upon further actuating the set/reset key 177 the continued frame advance operation is interrupted and LED 231 is disenergized. The coiffure when the apparatus is in the reset position is projected again.

Figure 28:
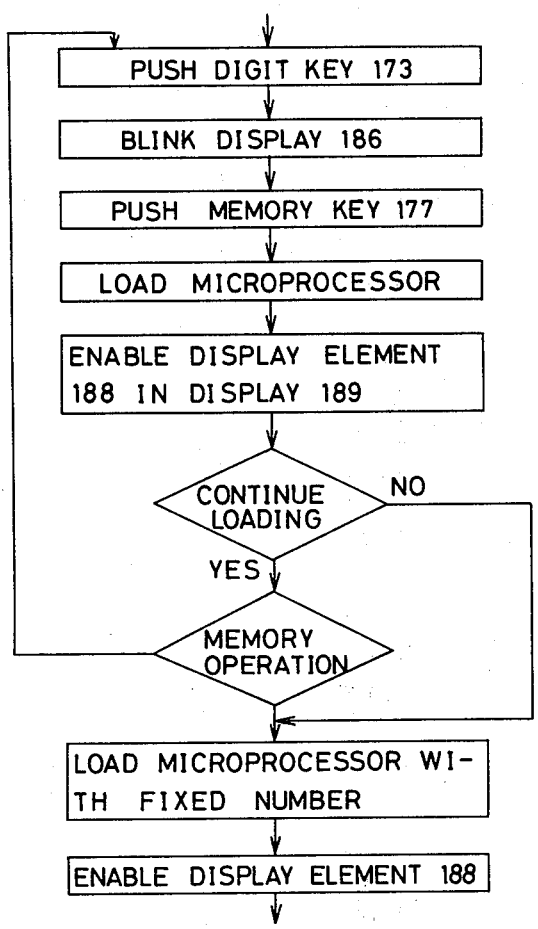

FIG. 28 is a flow chart showing the memory operation. When the digit keys 173 are actuated to introduce a particular slide identifying number, the display section 186 displays that selected number. Under these circumstances the memory key 177 is actuated to load the first memory with that number. The display element 188 in the display section 189 indicates that the first memory has been filled with the slide identifying number. The above procedure is repeated when the memory operation is to continue. One of the remaining memories is loaded and the display element 188 displays this event each time the above procedure is achieved in. The memory procedures are achieved desired times under control of the controller and the number of the memories is displayed on the element 188.

To confirm the slide identifying numbers stored in the respective memories, the display key 180 is actuated so that the numbers are sequentially displayed on the display section 186. When the memories are to be cleared, the clear key 175 is depressed to clear all of the memories.

Figure 29:
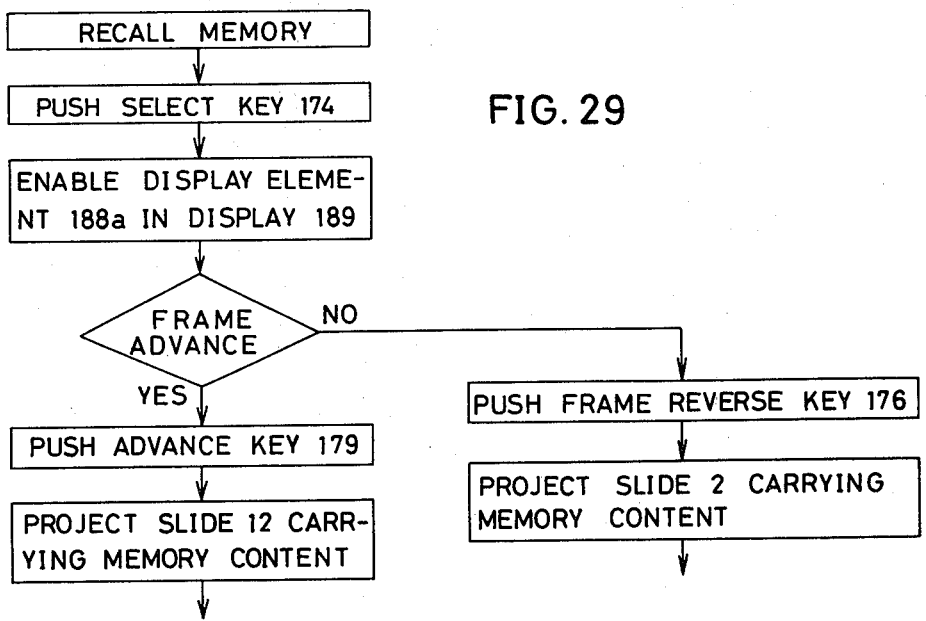

FIG. 29 is a flow chart of how to recall the slide identifying numbers stored in the memories and project the associated slides on the screen. When the select key 174 is depressed to recall the memories, the display element 188a on the display section 189 indicates that the memories are being recalled. Then, the frame retrieval key 179 is actuated alone so that the slide identifying number stored in the first memory appears on the display section 185 and the apparatus searches for the associated slide mount 13. Thereafter, the slide mount 13 is located in projection position to project the slide 12 thereon. The above procedure is repeated to recall all of the memories.

If the reverse frame key 176 is actuated instead of the retrieval frame key 179 under these circumstances, then the display section 185 displays the slide identifying number in the last memory and the apparatus searches for that slide to project the coiffure thereon. The above procedure is repeated such that the memories are recalled in the order from the last memory to the first. Under these circumstances, forward frame advance or reverse frame feeding can be switched at the moment where the frame retrieval key 179 or the reverse frame key 176 is actuated.

Although in the above illustrated embodiment the reversible motor 20 is used to rotate the rotary magazine 15 in a forward direction or a backward direction, a reversible clutch and a reduction gear may be coupled with the first motor 28. Furthermore, the display section 186 may display "F" to call the operator's attention when all of the memories are full.

Another preferred embodiment of the present invention wherein a camera is built in the synthesizer and projector is illustrated in FIGS. 30 to 59. Similar designations are used to indicate similar components as in the previous embodiment.

Figure 30:
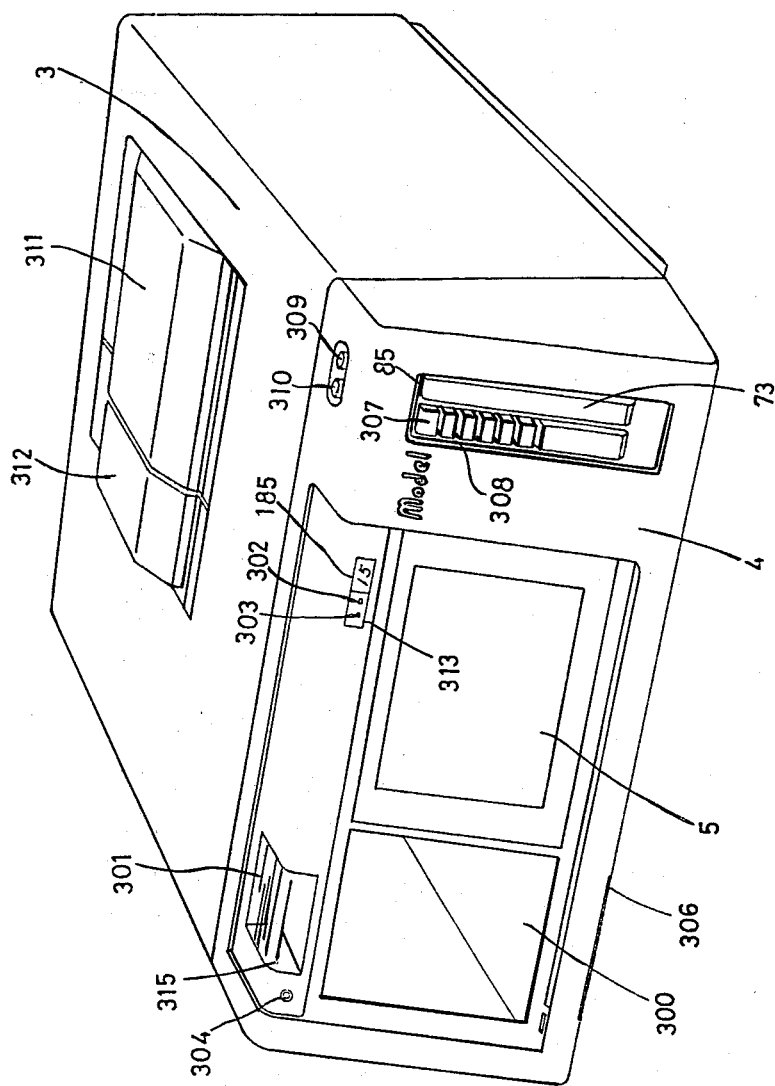
FIG. 30 is a perspective view of the appearance of an image synthesizer and projector equipped with an instant camera according to another preferred embodiment of the present invention.

As shown more particularly in FIG. 30, the synthesizer and projector includes the screen 5 secured on the front panel 4, a movable half mirror 300, a strobe 301 used for taking pictures of the face portion of customers, the display section 185 for displaying the slide identifying numbers being projected on the screen, whether the rotary magazine 15 is in place and whether the slide mounts 15 have been inserted into the rotary magazine 15, a synthesis mode display section 302 including the above mentioned LED 230, a display section 303 for displaying whether the number of the memories is incremented or decremented, a display section 304 for displaying that the strobe 301 is ready to emit light, and an outlet port 305 for delivering photographs taken by use of the camera (for example, an instant camera) housed below the half mirror 300 in the frame 3.

The front panel 4 is further provided with the slot 85 for the photograph holder 73, a cavity 308 wherein a remote control 307 for the camera 305 is housed, an eject key 309 for ejecting the photograph holder 73 from the slot 85, and another eject key 310 for ejecting the remote control 307 from the cavity 308. Over the frame 3 there is disposed a cover 311 for the operational panel 7 carrying the respective keys and knobs 161 to 182. A magazine cover 312 is further provided for exchange of the rotary magazine 15. It is preferable that a colored (e.g., red) transparent filter be located in front of the display sections 302, 303 and 304 and an uncolored transparent filter 315 be in front of the strobe 301.

Figure 31:
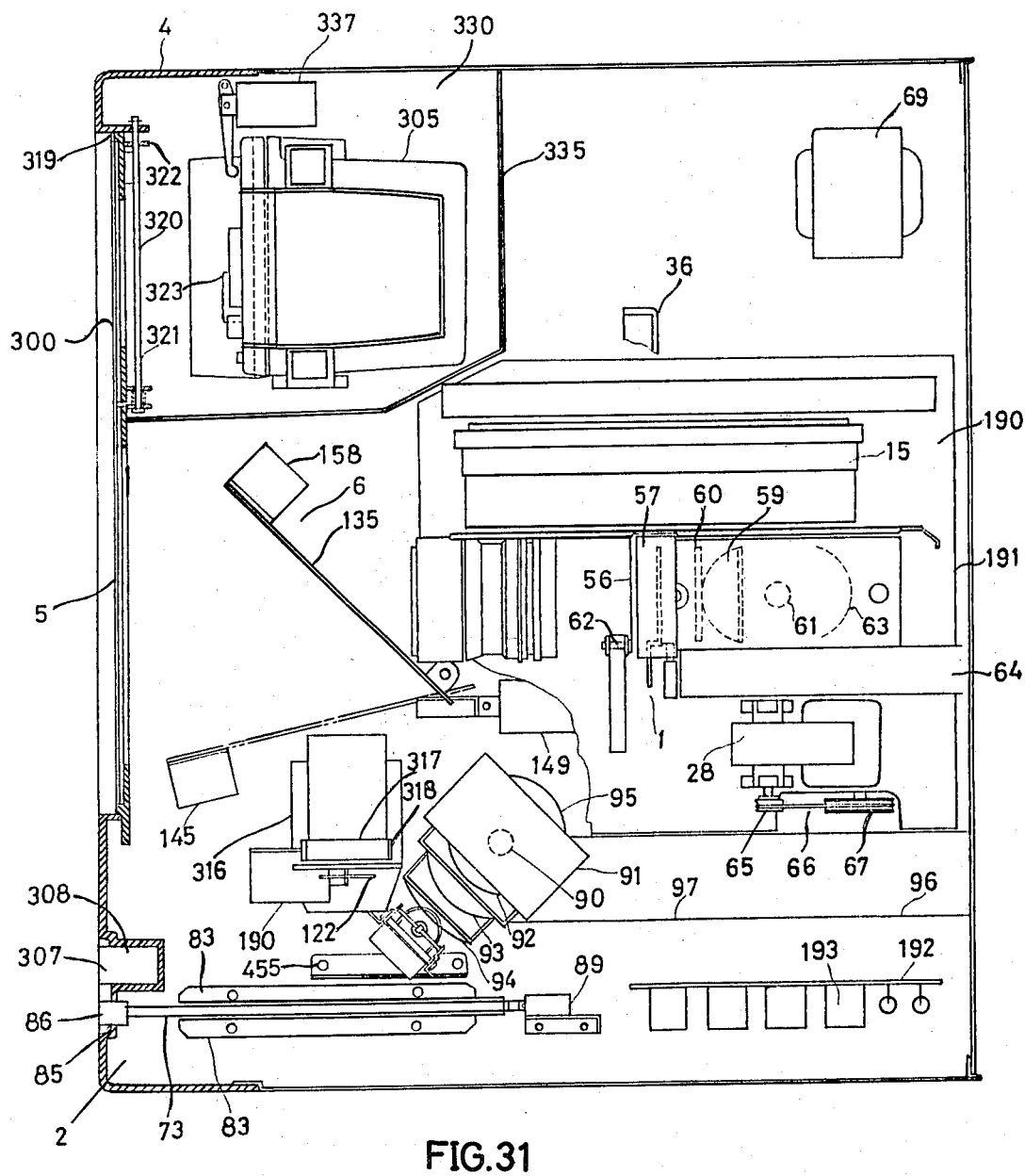
FIG. 31 is a plan view of essential parts of the machine of FIG. 30.
Figure 34:
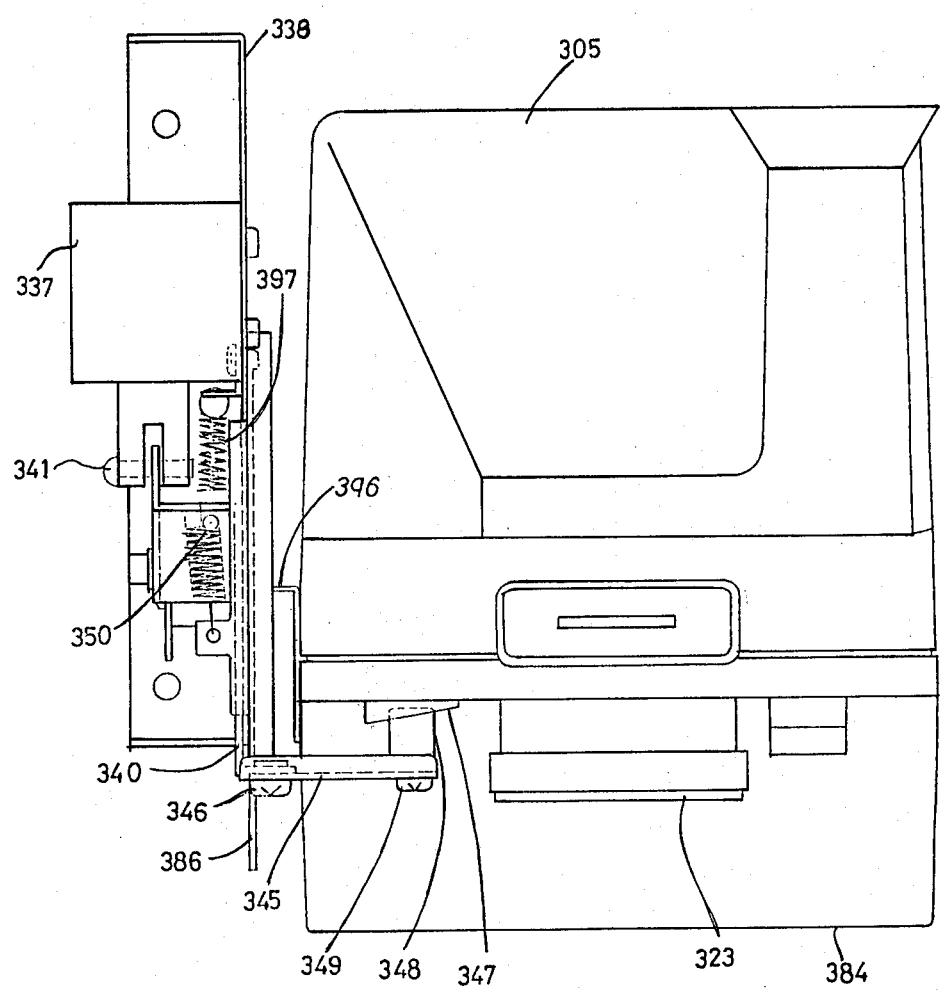
FIG. 34 is an enlarged plan view of the camera of FIG. 32.
Figures 35, 36:
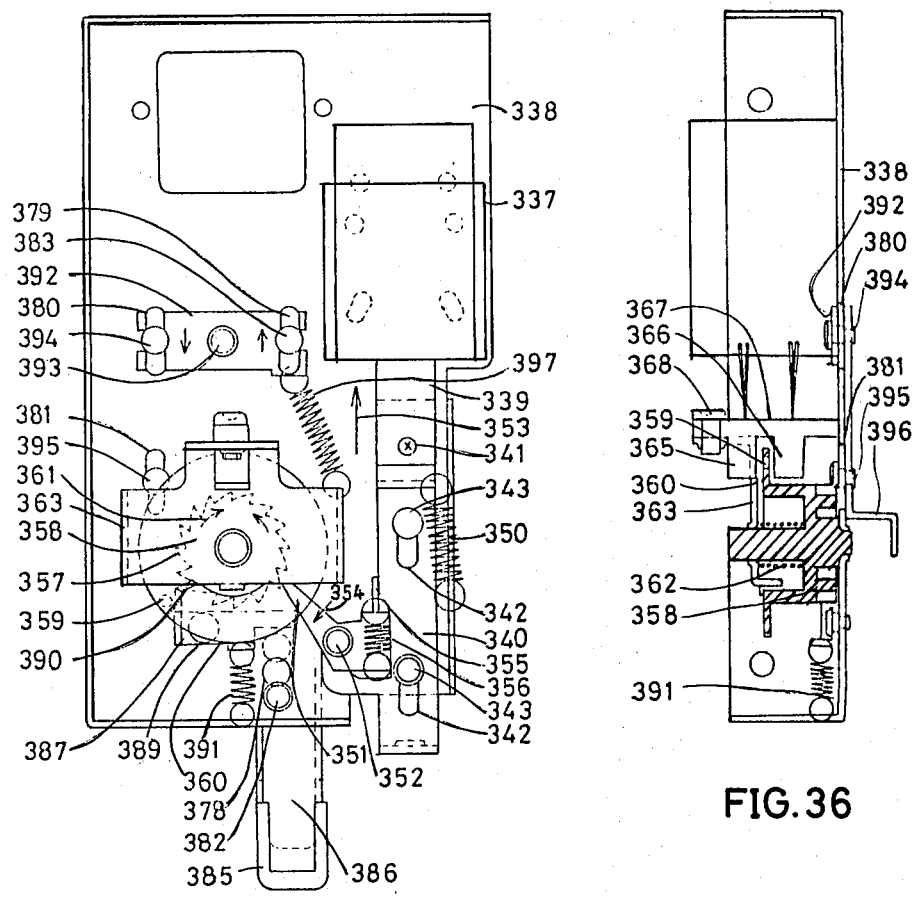
FIG. 35 is a side view of an essential part of the camera of FIG. 34.
FIG. 36 is a cross sectional view of the camera of FIG. 35.
Figure 37:
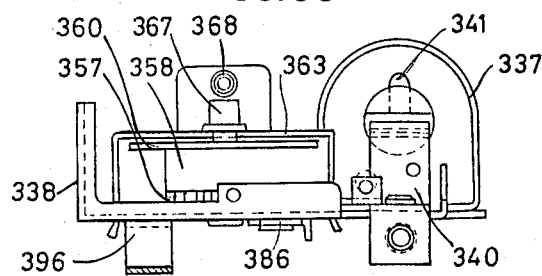
FIG. 37 is a front view of the essential part of FIG. 35.
Figure 38:
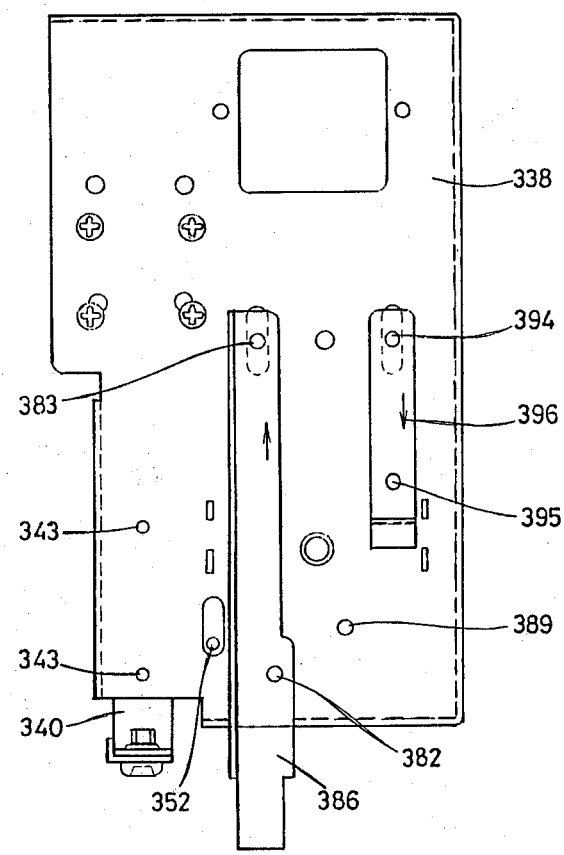
FIG. 38 is a rear view of the essential part of FIG. 35.
Figure 39:
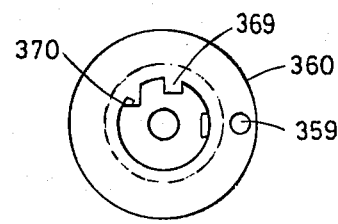
FIG. 39 is a plan view of an essential part of a ratchet in FIG. 35.
Figure 40:
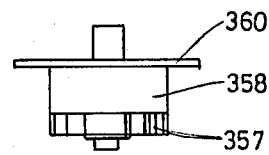
FIG. 40 is a front view of an essential part of the ratchet of FIG. 39.
Figure 41:
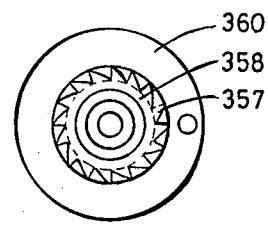
FIG. 41 is a rear view of the essential part of the ratchet of FIG. 39.
Figure 42:
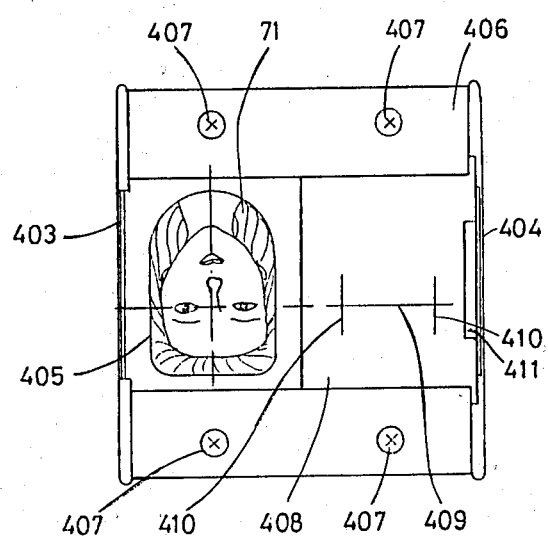
FIG. 42 is a front view of an essential part of the photograph holder in FIG. 31.
Figure 43:
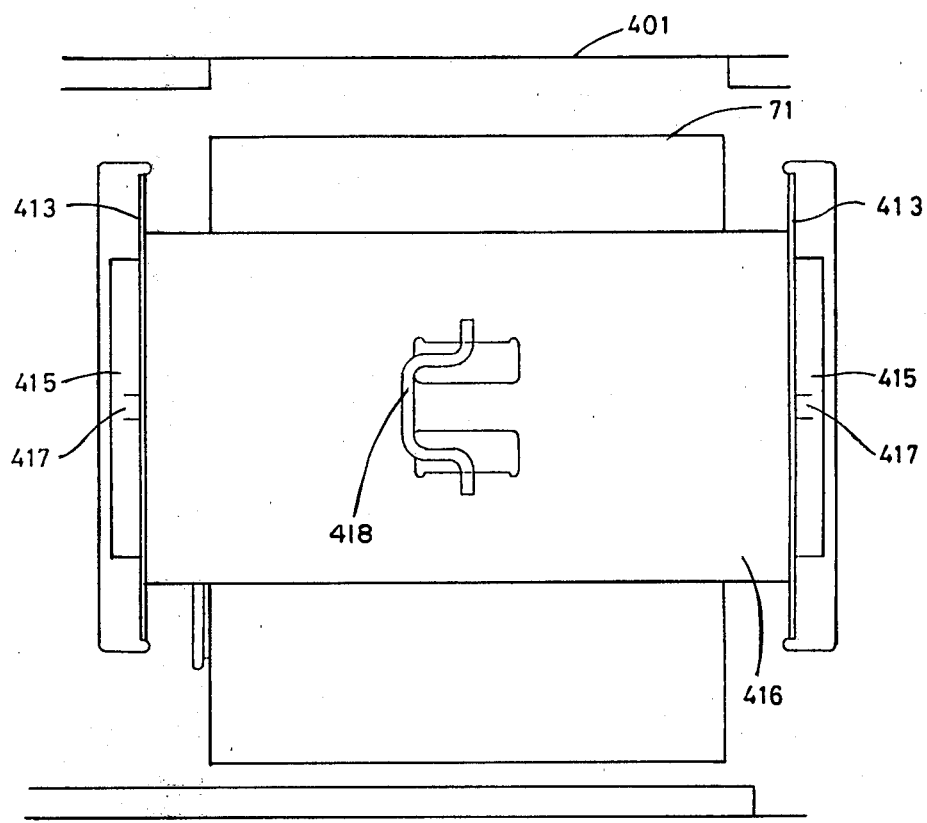
FIG. 43 is a rear view of the holder of FIG. 42.
Figure 44:
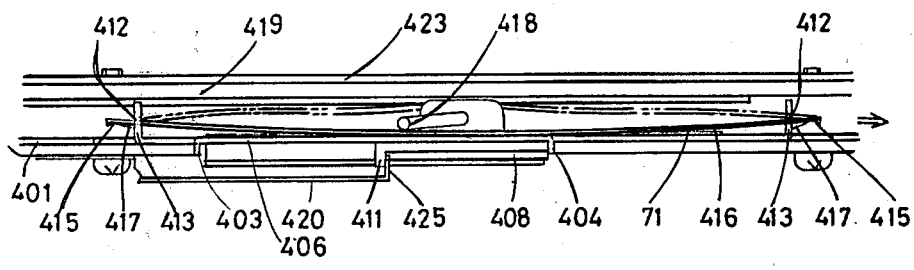
FIG. 44 is a longitudinal cross sectional view of the essential part of FIG. 42.
Figures 45, 46:
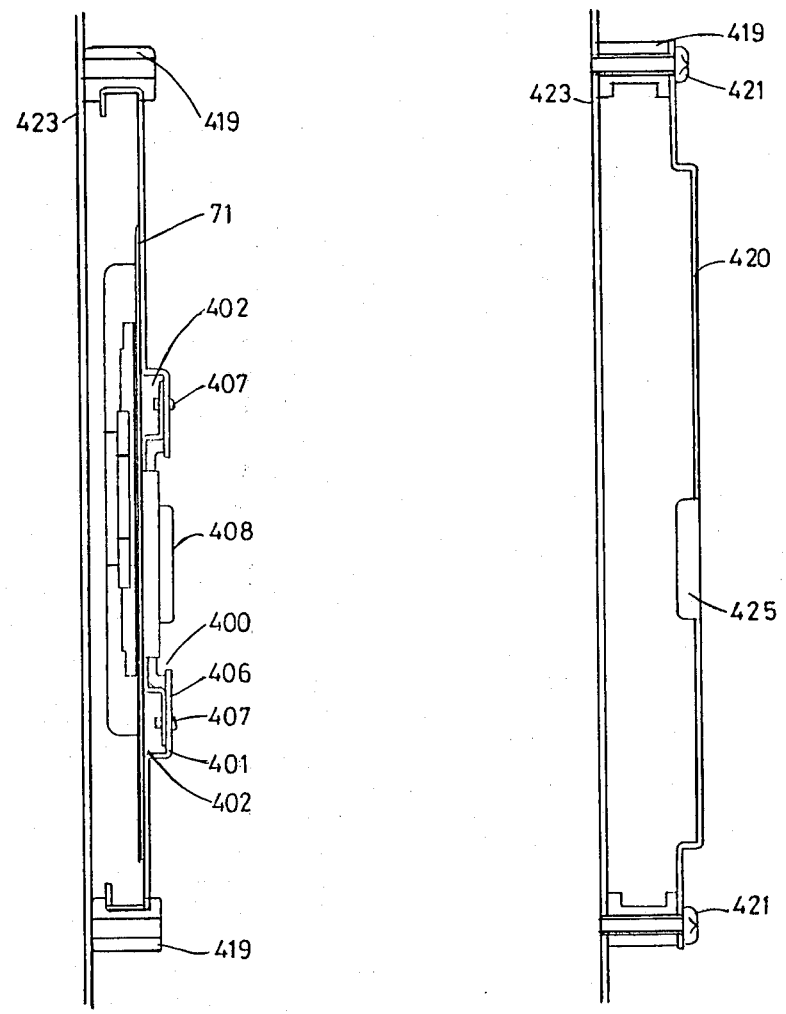
FIG. 45 is an elevational cross sectional view of the essential part of FIG. 42.
FIG. 46 is an elevational cross sectional view of an essential part of the holder of FIG. 42.
Figure 52:
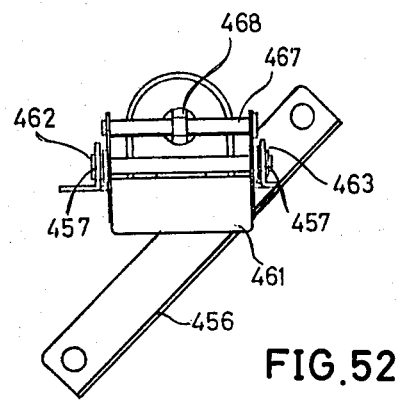
FIG. 52 is a plan view of a synthesis line selector in FIG. 31.
Figure 53:
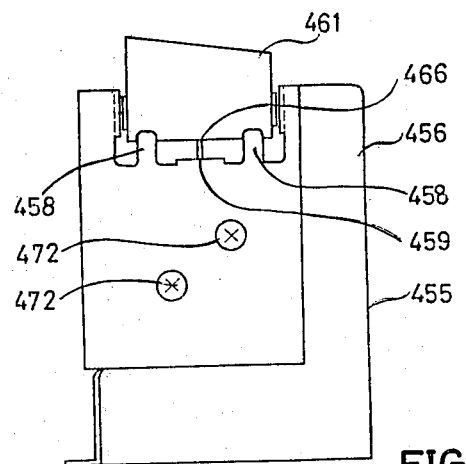
FIG. 53 is a front view of an essential part of the selector of FIG. 52.

FIGS. 31 to 33 indicate that this embodiment is substantially same as the previous one except for the presence or absence of the camera 305 and a zoom lens 316, with the latter focusing the face image B on the photograph 71 at a predetermined magnitude.

A zoom lens 316 permits zooming by rotating a gear 318 formed at a zooming ring 317 by use of a reduced motor (below the lens, though not shown), thus eliminating the need for focus adjustments.

Preferably, the camera 305 is of the instant type or auto-focus type which automatically measures the distance with respect to an object (or the customer) and performs focusing. A built-in motor automatically loads brings a film in place and delivers the film via the outlet 306 after being exposed and developed. An EE (electronic eye) assembly is preferably installed to automatically adjust exposure time.

A shutter in the camera 305 is under control of the remote control 307 leading from a cable (not shown). The length of the cable is such that focusing is possible when the customer is setting on a chair in front of the camera. The amount of light released from the strobe 301 is properly adjusted in advance. These eliminate the need for manual focusing, simplify an exposure mechanism (e.g., for varying exposure time, shutter speed or light amount of the strobe) and permit quick and simple photographing.

The half mirror 300 is secured in a mirror holder 319 which in turn is provided with a rib 322 having an opening 321 for receiving a shaft 320. The rear of the half mirror 300 is overlaid with a cover 325 to screen the interior of the camera 305 except for a front opening 324 in a lens 323 through the half mirror 300 from view. Guide ribs 328 and 329 are respectively disposed on the cover 325 and the front panel 4 to guide the photographs 326 to the delivery port 306 corresponding to a delivery port 327 of the camera 305. In order that incident light via the delivery port 306 does not make visuable the interior 330 via the opening 324, a shutter 331 is fixed to a threaded stud 332 on the front panel 4 in such a way as to close the delivery port 306. The shutter 331 has a rotary shaft 333 and a stop 334 formed therein by bending for preventing the shutter 331 from being depressed below a predetermined level.

With such an arrangement, the photograph 326 is fed from the delivery port 327 of the camera 305 via the guide ribs 328 and 329 and smoothly discharged out of the counterpart 306 of the front panel 4 while being urged down the shutter 331. Further, a wall 335 surrounding the shutter 331 and the camera accommodations 330 permits only a minimum of introduced light in the neighborhood of the accommodations 330 in order that the rear of the half mirror 330 is concealed except for an opening area necessary for taking pictures. This results in enhancing the transmission factor of the half mirror 300 and eliminating the need for increasing the light amount of the strobe.

The following will set forth how to operate the camera 305. Mounted on a fixing angle 338 adjacent the camera 305 is a solenoid 337 mounted by means of a threaded stud which is operable in response to actuation of a shutter key 336 on the remote control 306. One end of an actuator 340 is connected to a rod 339 in the solenoid 337 via a threaded stud 341 and a pin 343 is snugly received within a slot 342 in the actuator 340 so that the actuator 340 is slidable with respect to the fixing angle 338. The other end of the actuator 340 is connected to an end of a shutter angle 345 by means of a threaded stud 346 whose other end is operatively connected through a threaded stud 349 to a pressure member 348 typically made of plastic which urges a shutter button 347 of the camera 305. A spring 350 is interposed between the actuator 340 and the fixing angle 338 not to urge normally the actuator 340 in the direction of actuating the shutter button 347. By using a pin 352 a pawl 351 is secured rotatable on the actuator 340. A stop 355 is disposed on the actuator 340 to prevent the pawl 351 from rotating against the absorbing force of the solenoid 337 (as depicted by the arrow 353 in FIG. 35). In order that one end of the pawl 351 normally abuts on the stop 355, a spring 356 is interposed therebetween. There is provided on a predetermined number of ratchets 358 a plurality of pawls 357 which engage with the feeding pawl 351 in sequence. Each of the ratchets 358 is provided with a disk 360 having an aperture 359 and a return spring 362 for returning the associated ratchet to home position in the direction of the arrow 361. Furthermore, the ratchets 358 are mounted rotatable on the angle 338 by use of a mount 363. A photo interruptor 367 consisting of a light emitting element 365 and a light receiving element 366 is secured on the mount 363 via a threaded stud 368 to sense the passage of the apertures 359 in the disks 360 of the ratchets 358. Further mounted on the mount 363 is a limiter 371 for limiting the movement of stops 369 and 370 formed away from the ratchets 358 and thus limiting the range of rotations of the ratchets 358. Once the stop 369 has been caught by the limiter 371, the ratchets 358 returns to home position to reset the film number of the camera 305 to zero. On the other hand, once the stop 370 has been caught by the limiter 371, the ratchets moves to stop position or the last film number (10 in the illustrated example). When this occurs, the aperture 359 is positioned in the photo interruptor 367 which in turn develops its output. This output is supplied to a lamp 373 (e.g., a neon lamp) located in a holder 375 resting in a recess 374 of the mirror holder 319 to fire that lamp. The lamp holder 375 is mounted such that a printed indicator 376 between the mirror holder 319 and the half mirror 300 is illuminated with the lamp 373. Therefore, the lamp 373 in fired state notifies the operator that the camera has run short of films. The angle 333 is provided with slots 378, 379, 380 and 381 for slidably receiving a pair of pins 382 and 383. A actuator lever 386 operatively associated with a knob 385 is slidably secured by use of the pins 382 and 383 on the rear of the angle 338 for the exchange of films. Mounted rotatable on the angle 338 via a pin 389 is a second lever 387 on which one end of the pin 382 abuts while sliding together with the actuator lever 386 upon actuation of the knob 385. The second lever 387 is provided at its one end with a pawl 390 which engages sequentially with the ratchet pawls 357 by the action of a spring 391 normally pulling the other end of lever 387. Further mounted rotatable on the angle 338 by means of a pin 393 is a rotary lever 392 one end of which is connected to the pin 383 sliding with the actuator lever 386. A pin 394 is secured on the other end of the rotary lever 392 for sliding in the slot 380 in the angle 338. Using the above mentioned pin 394 and a pin 395 slidable in the slot 381 in the angle 338, an opening lever 396 is secured slidably along the rear of the angle 338 for opening the film pack cover 384. A spring 397 is interposed between the mount 363 and the rotary lever 392 to normally bias the actuator lever 386 to home position.

The solenoid 337 is energized to draw the rod 339 in the direction of the arrow 353 against the spring force of the spring 350 when the shutter key 336 on the remote control 306 is depressed. The actuator 340 then slides in the direction of the arrow 353 so that the pressure member 348 presses down the shutter button 347. At the same time the feeding pawl 351 is brought into engaging relationship with the ratchet pawls 357 to rotate the ratchets 358 by a predetermined angle. In the event that the ratchets 358 are rotated until the above shutter operation is repeated and the films are consumed, the aperture 359 in the disk 360 is between the two elements 365 and 366 in the photo interruptor 367 so that the photo interruptor develops its output effective in firing the lamp 373. The operator is instructed to insert a new film-pack. When the knob 385 is actuated by the operator to slide the actuator lever 386 on the angle 338 against the force of the spring 397, the opening lever 396 interlocked with the actuator lever 386 places the film-pack cover 384 into open position to enable him to exchange the film-pack. The pawl 387 is further rotated by the actuator lever 386 so that the pawl 390 disengages the ratchet pawls 357 and returns the ratchet 358 to home position under the influence of the spring 362.

Referring more particularly to FIGS. 42 to 46, there is formed in a photograph holder 401 an opening 400 which is open in a direction toward a light source for transmission of only the image B of the face portion of the customer with or without the coiffure. A cursor guide angle 406 having an opening 405 for transmission of the face image B is fixed by means of a threaded stud 407. A cursor 408 is spaced slidably at a distance over the opening 400. It is preferable that the cursor 408 be of transparent material with alignment markings 409 and 410 (e.g., for the eye level of the image B). The cursor 408 is further provided with a projection 411 and a finger 413 having an aperture 412 is provided at the back of the holder 401. A fitting 415 to be fitted in the aperture 412 is disposed on a mount 413 which is flexible and of a size slightly larger than the fitting 415. A stop 417 is formed on the fitting 415 for inhibiting the fitting 415 from removing from the aperture 412. Furthermore, mounted on the mount 416 is a handle 418 for placing or detaching the mount 416 on or from the holder 401 in a bent form (as shown in the solid line or the phantom line in FIG. 44). The holder 401 is secured tightly on a holder guide 419 which is affixed to a guide support 423 having a handle 86 as well as a cursor remover 420. Formed on the cursor remover 420 is a projection 425 which is in contact with the projection 411 on the cursor 408 to help the cursor 408 slide at a distance with respect to the opening 400 (as seen from FIG. 42) when the guide support 423 is inserted into an inlet port 851. It will be noted that the cursor 408 may be such slided as to bring the eye level of the image B into agreement with the markings 409 and 410.

As shown in FIGS. 47 to 51, an electrode plate 431 removably connected to an electrode 430 of the lamp 90 (e.g., a halogen lamp) is attached to a first socket 433 by a fitting 432, the first socket 433 being mounted on a lamp removal angle 437 having a handle 436. An electrode plate 439 to which an electrode 438 of the first socket 433 is removably connected is inserted into a second socket 441. The second socket 441 is fixed via a threaded stud 442 in a lamp housing 443 in which an inlet 445 is provided for a cord leading from the second socket 441 together with a reflective mirror 446 for the lamp 90. A cover 448 with an aperture 447 is disposed over the lamp housing 443 and an angle guide 449 is provided in the lamp housing 443. The housing 443 further contains therein a condenser lenses 92 and 93, a heat ray absorption lens 450 and a cylindrical lens 94 with the help of fittings 451 and 452. To exchange the lamp 90, the lamp is removed from the housing 443, while the handle 436 is being held, and the angle 437 is inserted into the aperture 447. Thereafter, the electrode 438 of the first socket 433 is inserted into the electrode plate 439 of the second socket 441 in the housing 443.

Figure 54:
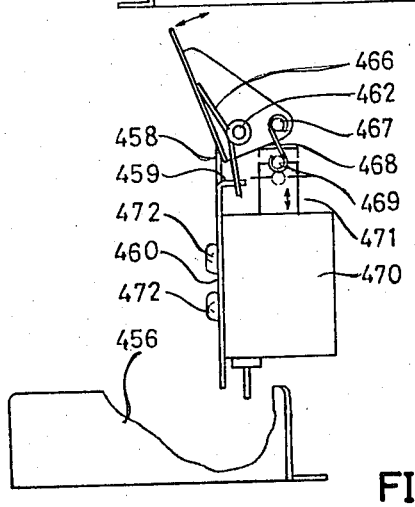
FIG. 54 is a cross sectional side view of the selector of FIG. 52.

A synthesis line switch selector 455, as indicated in FIG. 31, is interposed between the light source unit 97 and the photograph holder 73. As is more clear from FIGS. 52 to 54, a shutter angle 456 on the platform 191 is provided with a shaft support 457, an alignment section 458, a spring support 459 and a solenoid support 460. A shaft 462 pivoted on a shutter 461 is secured rotatably on the shaft support 457 through the use of an E ring 463. The shutter 461 is therefore pivoted on the angle 456 and a central portion of a return spring 466 is mounted on the shaft 462. One end of the spring 466 is attached to the support 459 with the other end thereof being in contact with the shutter 461. The return spring 466 biases normally the shutter 461 in the direction of the arrow A. The shutter 461 itself is held in place by the alignment section 458 as depicted in FIG. 54. Pivoted on the shutter 461 is a pin 467 to which one end of an "S"-shaped buffer spring 468 is attached with the other end thereof being attached to a plunger 471 of the solenoid 470. It is noted that the solenoid 470 is mounted on the support 460. In the case where the coiffure A is an up style with an upwardly-oriented fringe, the solenoid 470 remains deenergized despite locating the slide mount 13, wherein the shutter 461 is at an inclination (as viewed from FIG. 54) under the influence of the spring 466 and the lamp 90 lightens the forehead portion of the image B. On the other hand, when the coiffure has a downwardly oriented fringe, the solenoid 470 becomes conductive in response to the signal indicative of the locating of the slide mount 13 so that the shutter 461 stands against the return spring 466 to shield off light of the lamp 90. In this manner, the composite line on the resulting composite image is selected depending on the selected one of the coiffures.

Figure 55:
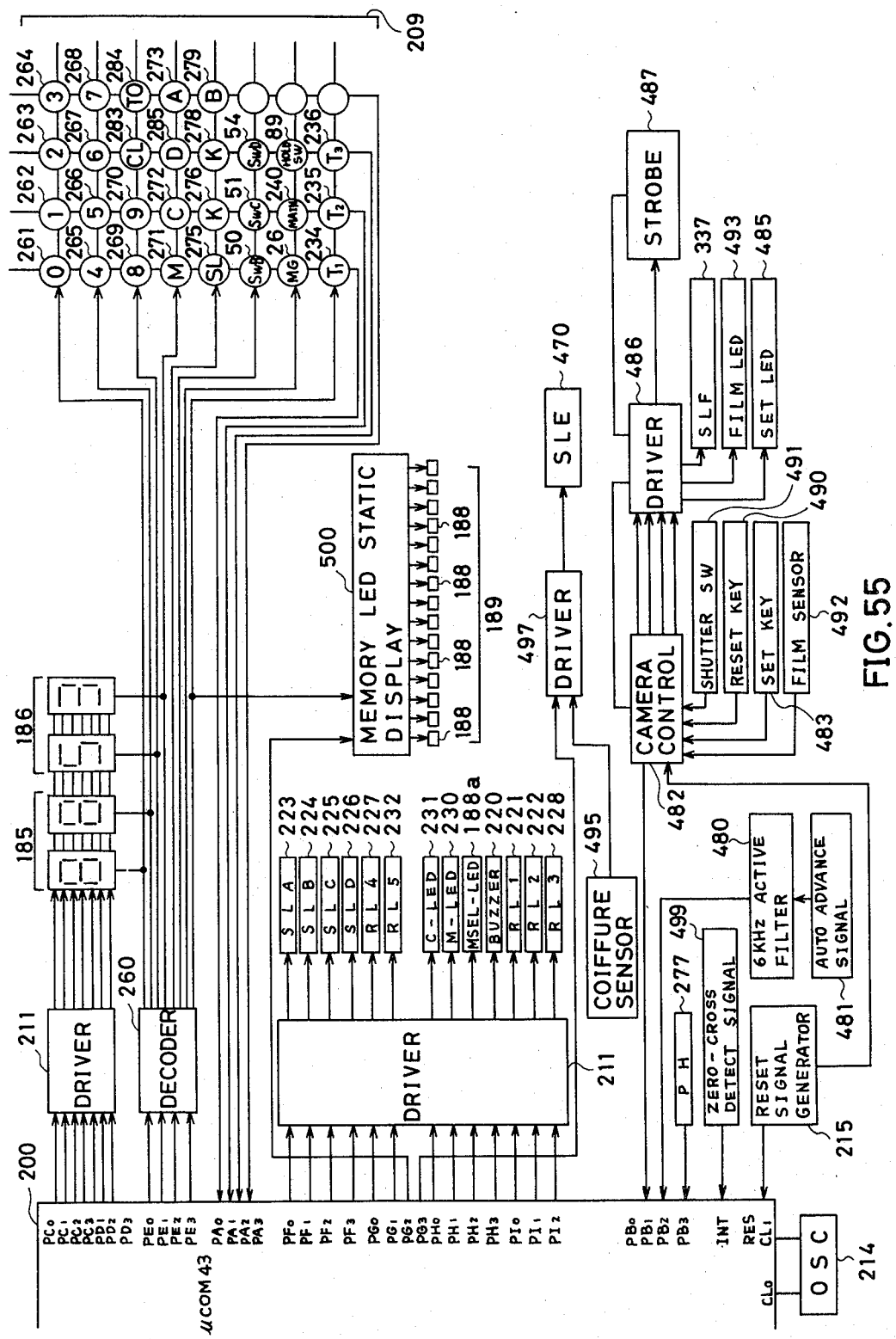
FIG. 55 is a block diagram of a controller of an image synthesizer and projector equipped with the camera according to the present invention.
Figure 56:
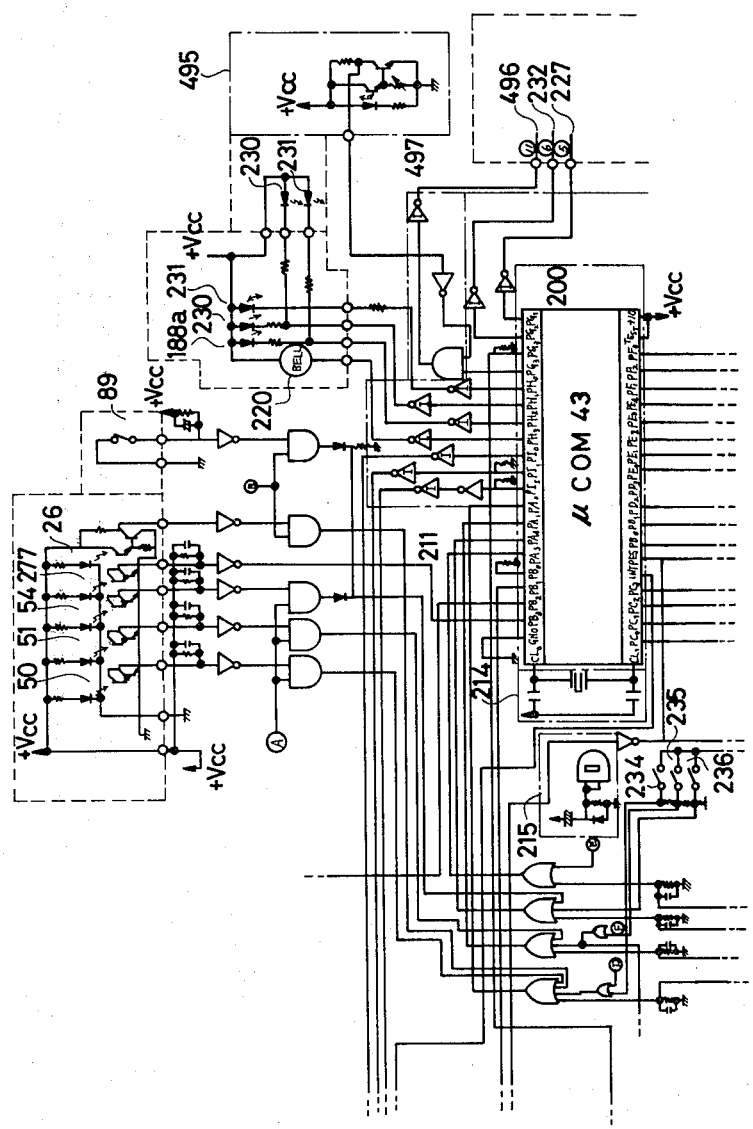
Figure 56:
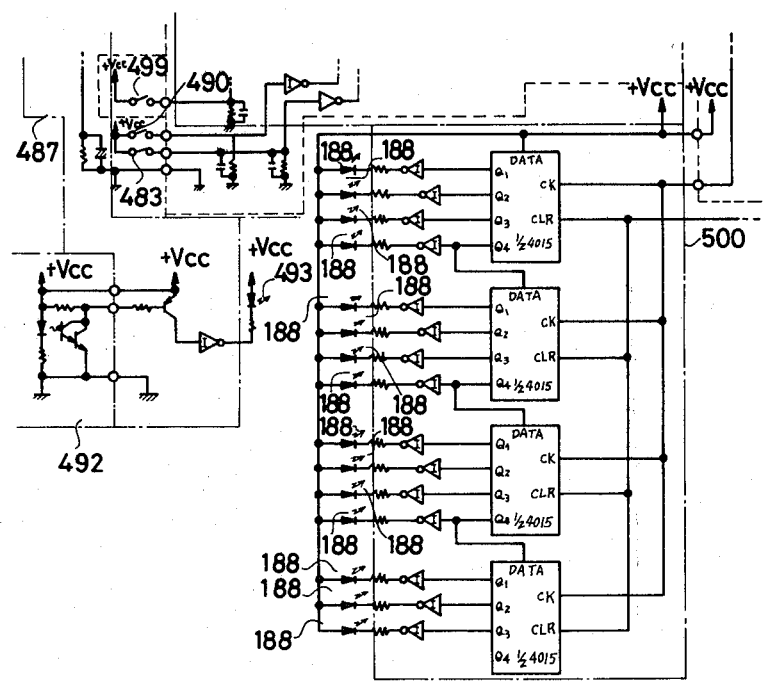
Figure 56:
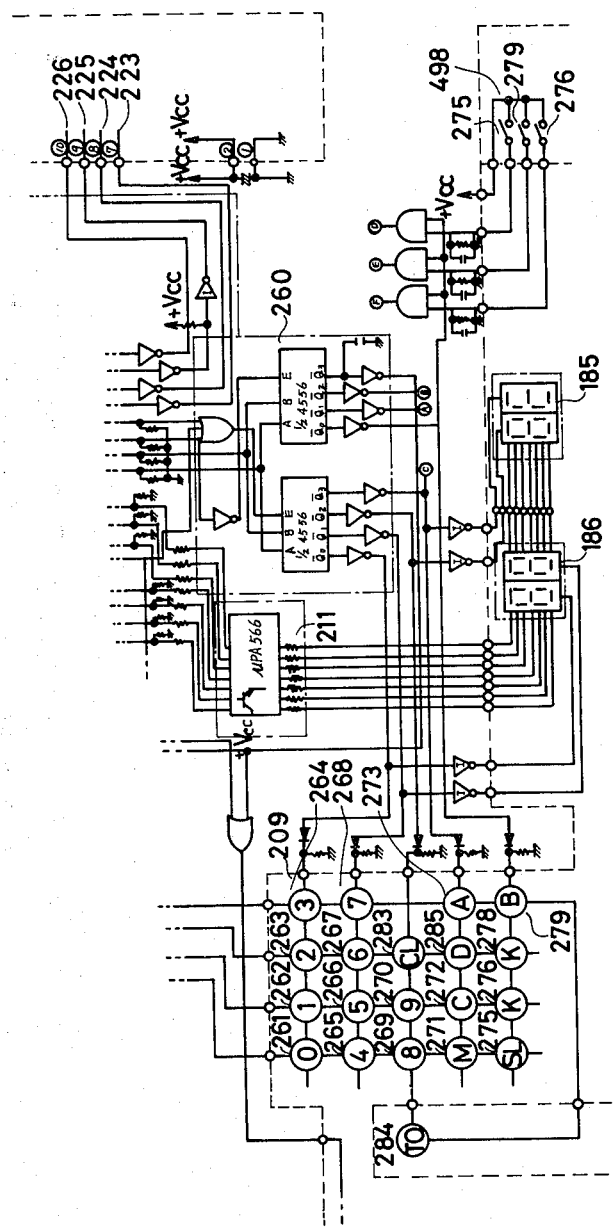

A circuit arrangment shown in FIGS. 55 and 56 is implemented with a μCOM 43 one-chip microcomputer. In a mode selector circuit, the signal from the fourth microswitch 89 is supplied to the key matrix 209 and the keys are always scanned to determine if the photograph holder 73 has been located in place. If the holder 73 is removed from the apparatus during synthesis mode, then the holder switch 89 is switched off. Key scanning senses this situation immediately and the microcomputer 200 reacts to the clear synthesis mode and establish the slide mode instead (that is, only the slide lamp 61 is energized and #5 solenoid 149 is disabled). This prevents the image free of the face portion from appearing on the screen 5 when the holder 73 is removed from the apparatus. In this case, when it is desirable to set the synthesis mode, the mode key 165 is actuated.

An automatic frame feed circuit comprises a 6 KHz active filter 480 typically set up by an operational amplifier. 6 KHz synchronizing signals or auto advance signals 481 are interposed between recorded programs on a tape or other mediums for feeding the slides in synchronism with the advance signals 431. The synchronizing signals are preferably more than 0.5 sec long to distinguish between signals and noise.

A camera control is labeled 482 and supplied with the reset signals from the reset signal generator 215. The camera control 482 establishes an initial condition for its components such as set/reset flip flops. Upon actuation of a set key 483 a display (i.e., a strobe displaying LED) 485 is energized and a charging start signal is supplied to a strobe circuit 487 via a driver 486. A phototransistor coupler 489 is connected as an interface between an LED driving IC and the strobe circuit 487, which coupler prevents the adverse effect of noise and high voltage (300-400 V) at the strobe circuit. A signal originating from the actuation of the set key 483 is sent to the microcomputer 200 which in turn interrupts key scanning. Once the set key 483 has been actuated to start charging, a reset key 490 is actuated to inhibit charging of the strobe. Under these circumstances, the display 485 is extinguished and key scanning starts again. If charging terminates, a signal is transmitted from the strobe circuit 487 to the camera control 482 via the driver 486. Thereafter, actuation of shutter switch 491 is treated as effective to thereby render the shutter solenoid 337 operative so that the strobe can be excited to emit light upon actuation of the shutter button 347. Key scanning is ready for a next input. As long as charging is not completed, the camera control 482 makes actuation of the shutter button 491 invalid. A film sensor 492 is provided to sense shortage of the films in the camera 305. The output of this sensor energizes an LED 493 via the camera control 482 and the driver 486. A coiffure sensor 495 (e.g., a reflective photosensor) is further provided so that its output, and combined with the outputs of the microcomputer 200, controls the driver 497 for exciting the coil 496 of the solenoid 470.

A remote control circuit is constructed as shown by 498. A remote controller 307 includes a shutter switch 491 in addition to the mode switch 275, the advance switch 276 and the reverse switch 279. By the action of the microcomputer 200 the former switch 491 is treated as invalid when the latter three switches are in effect. On the other hand, when the shutter switch 491 is in effect, the three switches are deemed as invalid. This function avoids malfunction of the apparatus even when one or more of the switches are inadvertently actuated. A zero-cross switching circuit receives as a zero-cross detection output a zero-cross output from the AC power supply source and provides enabling signals for the first, second and third relay coils 221, 222 and 223 under control of the microcomputer 200. Therefore, on-off switching of the lamps 61 and 90 and the first through third relays 221–223 is performed at the moment of zero-crossing. When the memory display 188 is long, it is driven in a dynamic fashion but a static display circuit 500 (typically, a shift register) is also used to enhance brightness.

Figure 57:
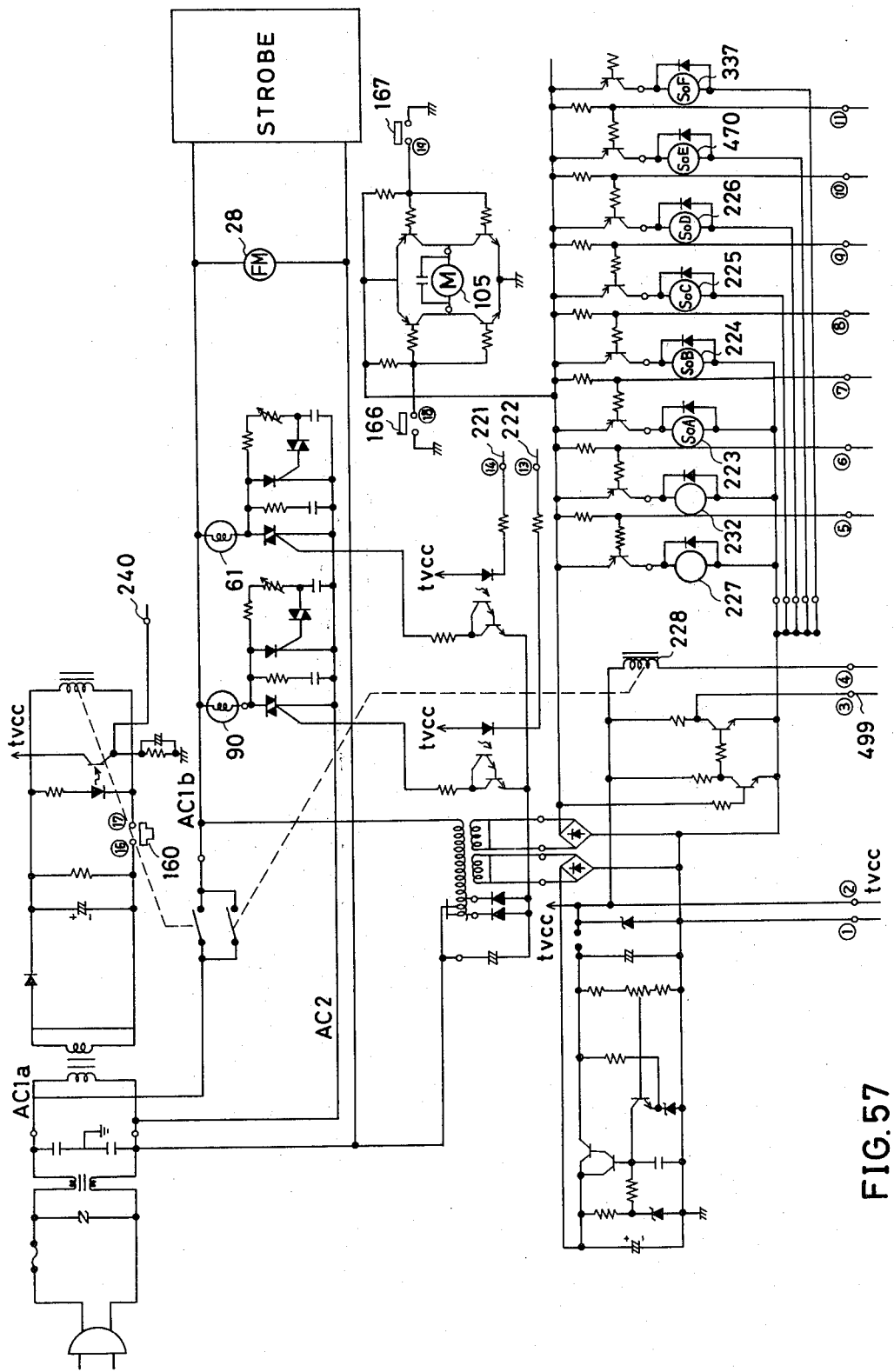
FIG. 57 is a circuit diagram of a power supply in FIG. 56.
Figures 58, 59:
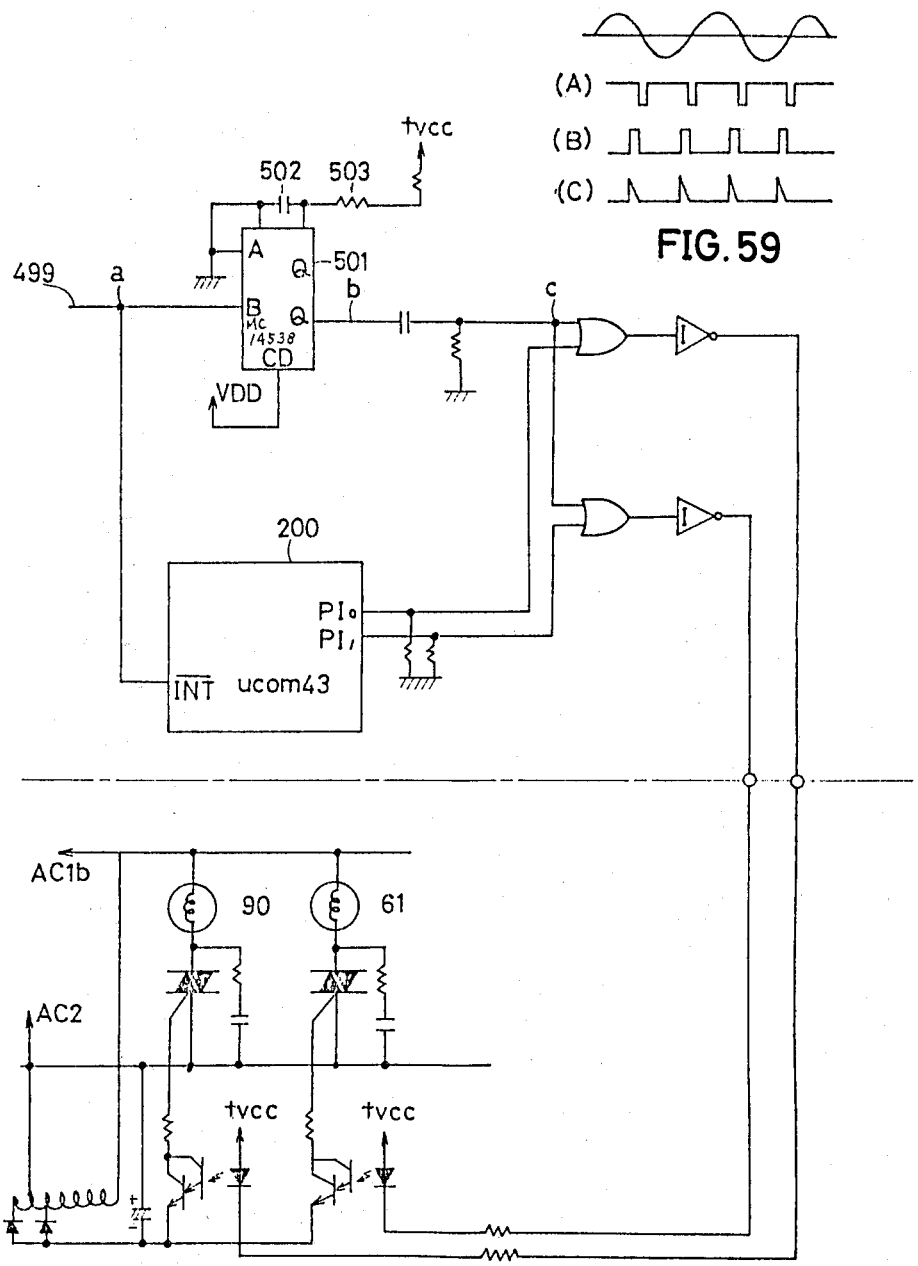
FIG. 58 is a circuit diagram of a modification in a slide lamp warm-up circuit in FIG. 55.
FIG. 59 is a waveform diagram of various signals appearing in the circuit of FIG. 58.
Figure 60:
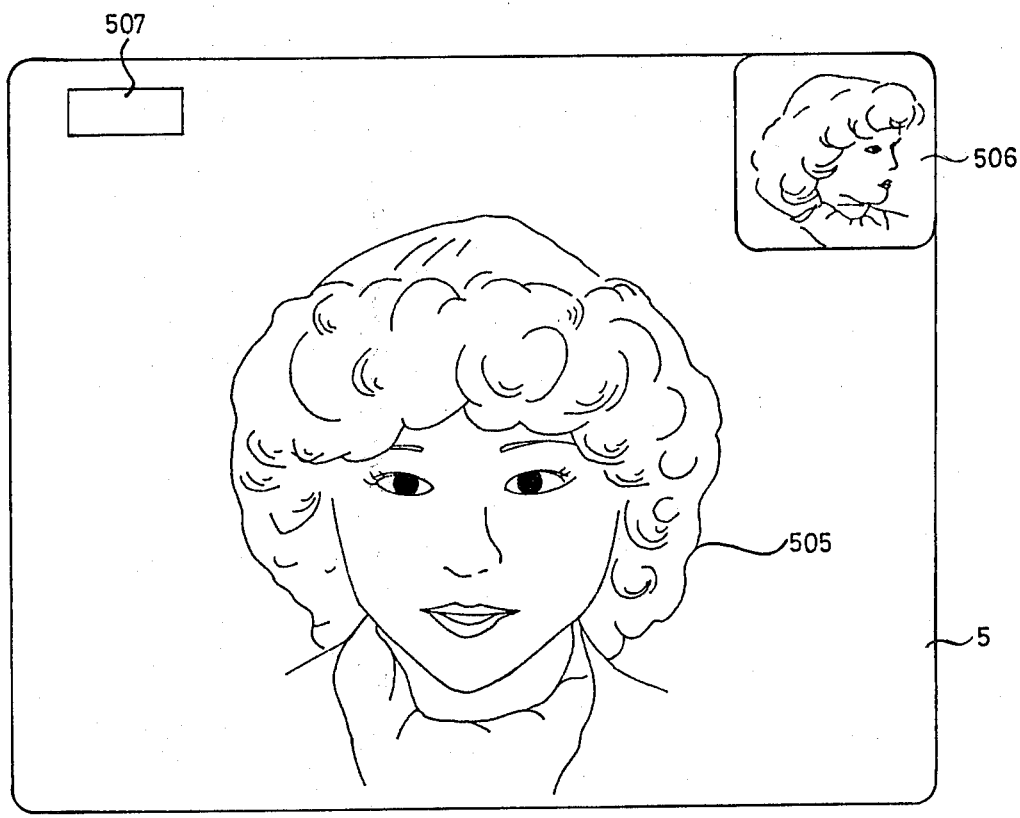
FIG. 60 is a front view of images on a screen.

Another example of the warm-up circuit as shown in FIG. 58 comprises a monostable multivibrator 501 receiving as a trigger input the zero-crossing signal 499 and delivering a pulse signal of a predetermined period of time as determined by a capacitor 502 and a resistor 503 externally connected for a triac. FIGS. 59(a) through 59(c) depict waveforms developing in the circuits as shown in FIGS. 56 to 58.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A coiffure image synthesis and display system comprising:

first image display means for displaying a first image of a user of said system;

second image display means for selectively displaying one of a plurality of second images representative of prepared coiffures;

screen means for displaying images thereon;

partial reflecting means for redirecting a portion of said first image onto said screen means, a portion of said second image being passed by said partial reflecting means and displayed on said screen means;

the portions of said first and second images being displayed on said screen means in combination producing a superimposed image of the user modeling a selected coiffure image; and selective movement means for selectively removing said partial reflecting means from an operative position, said selected coiffure image thereby being displayed by said screen means in its entirety while said first image of the user is not displayed on said screen means.

2. The system of claim 1 wherein said first image is generated by an instant camera.

3. The system of claim 2 wherein said second images are generated by prepared slides.

4. The system of claim 1 wherein said first and second image display means project said first and second images in intersecting orthagonal paths;

said partial reflecting means including a mirror disposed at an angle of approximately 45° at the intersection of said paths, said mirror reflecting said portion of said first image.

5. The system of claim 1 wherein said selective movement means pivots said mirror about a rotation axis so as to remove said mirror from the path of said second image.

6. The system of claim 4 wherein said first and second image display means each include;

means for illuminating a picture to produce an initial image; and lens means for focusing the initial image to produce said first or second image.

7. The system of claim 6 wherein the distance said first and second images travel along said orthagonal paths to said screen means is equal.

8. The system of claim 7 further comprising mirror position adjustment means for adjusting the position of said mirror within its plane so as to vary the location of said portion of said first image within said superimposed image.

9. The system of claim 8 wherein said first image display means includes a picture holder for supporting said picture.

10. The system of claim 8 further comprising:

first means for sensing the presence of said picture holder and energizing said respective means for illuminating only upon proper location of said picture holder in said first image path.

11. The system of claim 10 wherein said second image display means further includes a slide holder for supporting said slide;

said device further comprising second means for sensing the presence of said slide holder and energizing said respective means for illuminating only upon proper location of said slide holder in said second image path.

12. The system of claim 11 further comprising picture adjustment means for adjusting the position of said picture holder, when inserted, to adjust the vertical location of said portion of said first image displayed by said first image display means.

13. The system of claim 12 wherein said lens means for focusing in said first image path is a zoom lens, said lens adjusting the magnification of said image to adjust the eye-to-eye center of the image of an individual's face to a desired size.

14. The system of claim 13 wherein said picture holder includes an aperture for displaying only the face of a customer displayed by said picture, said aperture having markings indicative of the level of the eyes and center of the face visable thereon.

15. The system of claim 14 further comprising a camera operable to take an instant picture of said customer, said finished picture dispensed therefrom being the proper size for display in said picture holder.

16. The system of claim 15 wherein said markings indicative of the level of the eyes and the center of the face are also placed on a viewfinder of said camera.

17. The system of claim 16 wherein said second image display means includes;
magazine means for supply slides to said slide holder, said magazine means being movable to select a desired one of said slides for supply to said slide holder, said magazine means being reset to a start position each time the power is switched ON.

18. The system of claim 17 wherein said selective movement means is enabled when said magazine means is located at a start position.

19. The system of claim 18 further comprising:
keyboard means for entering information indicative of a desired slide; and
means responsive to said information entered by said keyboard means for selecting said desired slide for supply to said slide holder.

20. The system of claim 19 wherein each slide has a slide number, the number corresponding to said desired slide being displayed on a digital display.

21. The system of claim 20 further comprising:
memory means responsive to said slide numbers entered by said keyboard means for storing the slide numbers of slides to be memorized.

22. The system of claim 21 further comprising recall means responsive to said slide numbers entered by said keyboard means for recalling said desired slides for supply to said slide holder.

23. The system of claim 22 wherein said memory means is an addressable random access memory.

24. The system of claim 23 wherein said keyboard includes a memory erase key;
said memory means being erasable in response to said memory erase key.

25. The system of claim 24 wherein said keyboard includes a frame advance key;
said magazine means being movable in response to actuation of said frame advance key.

26. The system of claim 25 wherein said keyboard includes an automatic advance key;
said second image display means further including automatic advance means for sequentially moving said magazine means, for presenting said slides to said slide holder and for locating said slide holder in said second image path, said automatic advance means including oscillator means for producing a repetitive signal to enable said means for sequentially moving, presenting and locating.

27. The system of claim 26 wherein the frequency of said oscillator means is variable to vary the frequency of said automatic advance means.

* * * * *